US009420216B2

(12) United States Patent
Lee et al.

(10) Patent No.: US 9,420,216 B2
(45) Date of Patent: Aug. 16, 2016

(54) IMAGE DISPLAY DEVICE AND METHOD OF CONTROLLING THE SAME

(71) Applicant: LG ELECTRONICS INC., Seoul (KR)

(72) Inventors: Chungha Lee, Pyeongtaek-si (KR); Younghwan Ryu, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 290 days.

(21) Appl. No.: 14/099,424

(22) Filed: Dec. 6, 2013

(65) Prior Publication Data

US 2014/0354791 A1    Dec. 4, 2014

(30) Foreign Application Priority Data

May 31, 2013    (KR) ........................ 10-2013-0062911

(51) Int. Cl.
| | |
|---|---|
| *H04N 7/18* | (2006.01) |
| *H04N 5/66* | (2006.01) |
| *H04N 5/64* | (2006.01) |
| *H04N 21/442* | (2011.01) |
| *G06K 9/00* | (2006.01) |
| *G06F 3/01* | (2006.01) |

(52) U.S. Cl.
CPC .................. *H04N 5/66* (2013.01); *G06F 3/011* (2013.01); *G06K 9/00228* (2013.01); *H04N 5/64* (2013.01); *H04N 21/44218* (2013.01); *G09G 2340/04* (2013.01); *G09G 2354/00* (2013.01); *G09G 2380/02* (2013.01)

(58) Field of Classification Search
CPC .......... G06K 9/00228; G06K 2354/00; G06K 2380/02; G06K 2340/04; H04N 5/66; H04N 5/64; H04N 21/44218; G06F 3/011
USPC ..................................................... 348/77, 739
See application file for complete search history.

(56) References Cited

U.S. PATENT DOCUMENTS

| | | | | |
|---|---|---|---|---|
| 8,756,501 B1 * | 6/2014 | Karam | ..................... | H04L 51/32 715/700 |
| 2009/0304205 A1 * | 12/2009 | Hardacker | ............. | H03G 3/301 381/104 |
| 2012/0075166 A1 * | 3/2012 | Marti | ..................... | G06F 3/011 345/1.1 |
| 2012/0224311 A1 | 9/2012 | Sutherland et al. | | |
| 2014/0028542 A1 * | 1/2014 | Lovitt | ..................... | G06F 3/017 345/156 |

FOREIGN PATENT DOCUMENTS

EP                2592614 A1    5/2013

* cited by examiner

*Primary Examiner* — William Tran
(74) *Attorney, Agent, or Firm* — Birch, Stewart, Kolasch & Birch, LLP

(57) ABSTRACT

An image display device including a main body; a flexible display unit arranged on a front side of the main body; a drive unit arranged on a rear side of the flexible display unit and configured to bend at least one part of the flexible display unit; and a controller configured to search for a user location and control the drive unit to transform the at least one part of the flexible display unit based on the searched user location.

16 Claims, 21 Drawing Sheets

IMAGE DISPLAY DEVICE AND METHOD OF CONTROLLING THE SAME

CROSS-REFERENCE TO RELATED APPLICATION

Pursuant to 35 U.S.C. §119(a), this application claims the benefit of earlier filing date and right of priority to Korean Application No. 10-2013-0062911, filed on May 31, 2013, the contents of which is incorporated by reference herein in its entirety.

BACKGROUND OF THE INVENTION

1. Field of the Invention

The present invention relates to an image display device, and more particularly to an image display device including a flexible display unit and a method of controlling the image display device.

2. Background of the Invention

An image display device includes a device for recording and playing moving images, and a device for recording and playing audio data. The device for recording and playing audio data includes a TV, a computer monitor, a projector, etc., as an image display device.

As the image display device becomes multifunctional, the image display device can perform capturing still images or moving images, playing music or video files, playing games, receiving broadcast and the like, as well as reproducing music or video files, so as to be implemented as an integrated multimedia player. Many efforts include not only changes and improvement of structural components but also software improvement to support and improve functions of the image display device.

In recent years, an image display device has evolved to provide a variety of designs, and accordingly a flexible display gains popularity for its lightweight and unbreakability characteristics. The flexible display makes possible wider application of a new user interface that is limitedly possible or impossible with the existing glass-based substrate.

SUMMARY OF THE INVENTION

Therefore, an aspect of the detailed description is to provide an image display device that is capable of improving a sense of immersion using characteristics of a flexible display unit that can be bent or be twisted.

To achieve these and other advantages and in accordance with the purpose of this specification, as embodied and broadly described herein, there is provided, an image display device including a main body, a flexible display unit that is arranged on the front side of the main body and is bendable by force, a drive unit that is arranged on the rear side of the flexible display unit and applies the force so as to bend at least one part of the flexible display unit, and a controller that searches for a user location and controls the drive unit so that the at least one part of the flexible display unit is transformed depending on the searched-for user location.

The image display device may further include a camera, in which the controller may search for the user location using an image captured by the camera.

In the image display unit, if the multiple users are searched for on the image, the controller may select at least the one user that serves as a reference in transforming the at least one part of the flexible display unit. In the image display device, tags that are obtained by tagging the multiple users may be output on the flexible display unit, and the controller may cause the at least one user of the tagged users to be selected using the tag associated with at least the one user.

In the image display device, the tags may be numbered in increasing order of the number.

In the image display device, if the user location is searched for, the controller may output the image on the flexible display unit, and may output a graphic object on a position of the user who is searched for on the image.

In the image display device, the controller may change at least one of a position and a size of the graphic object using a signal received from an external input device, and may transform the at least one part of the flexible display unit, based on at least the changed one.

In the image display device, when the transformation of the at least one part of the display unit is completed, the controller may cause the camera to capture an image again in a state where the transformation is completed, and may re-search for the user location using the image that is captured again.

In the image display device, the controller may transform the at least one part of the flexible display unit depending on the researched-for user location.

The image display device may further include first and second microphones, in which the controller may search for the user location using a difference in time between sound signals from the first and second microphones.

In the image display device, the controller control search for the user location using a signal that is received from an external input device.

In the image display device, the controller may output transformation information relating to the flexible display unit on the flexible display unit.

In the image display device, the controller may change the transformation information using information that is received from an external input device and may transform the at least one part of the flexible display unit, based on the changed transformation information.

The image display unit may further include first and second audio output units, in which as the at least one part of the flexible display unit is transformed, the controller can perform control so that amounts of sound that are output from the first and second audio output units are different from each other.

In the image display device, the controller can perform the control so that of the first and second audio output units, one that is positioned closer to the searched-for user outputs a greater amount of sound than the other.

In the image display device, if the user location is searched for, the controller may output information relating on the searched-for user location on the flexible display unit.

In the image display device, the closer the searched-for user location is to the center of the flexible display unit, the greater the curvature may be with respect to the at least one part of the flexible display unit that is transformed.

In the image display device, the controller may bend the at least one part of the flexible display unit so that the at least one part of the flexible display unit is closer to the searched-for user location.

In the image display device, the controller may transform the at least one part of the flexible display unit so that a constant distance is maintained between an entire region of the flexible display unit and the searched-for user location.

In the image display device, when receiving a power-off command, the controller may restore the at least one part of the flexible display unit to its original state.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings:

FIG. 17 is a diagram illustrating the image display device when the multiple users are searched for;

DETAILED DESCRIPTION OF THE INVENTION

Description will now be given in detail according to the embodiments, with reference to the accompanying drawings. The embodiments of the present invention are merely illustrative, and the present invention may be implemented in various forms. For the sake of brief description with reference to the drawings, the same or equivalent components will be provided with the same reference numbers, and description thereof will not be repeated.

In this specification, an image display device may include a device for receiving and displaying broadcast data, a device for recording and playing moving images, and a device for recording and reproducing audio data. Hereinafter, a TV will be described as an example of the image display device.

Figure 1:
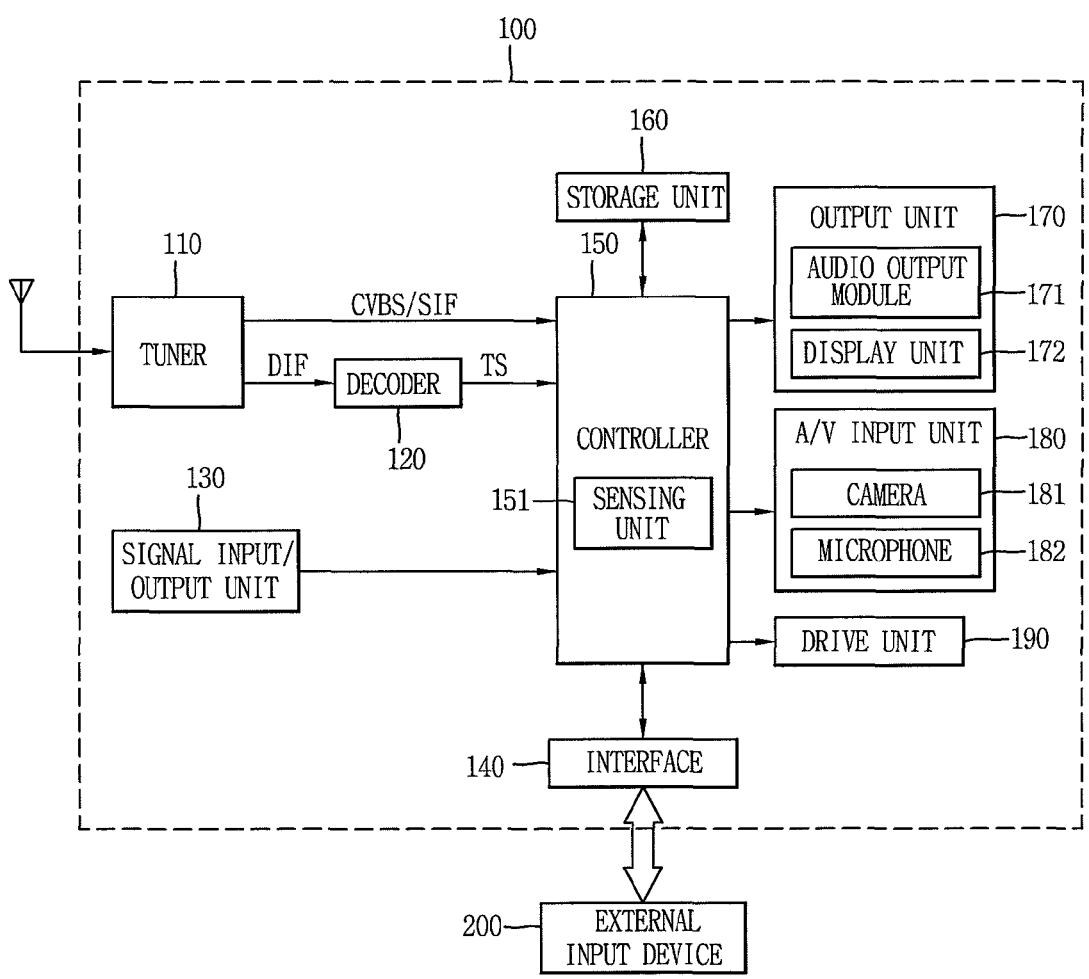
FIG. 1 is a block diagram illustrating an image display apparatus according to an embodiment of the present invention and an external input device.

FIG. 1 is a block diagram illustrating an image display device 100 and an external input device 200 according to an embodiment of the present invention. The image display device 100 may include a tuner 110, a decoder 120, a signal input/output unit 130, an interface 140, a controller 150, a storage unit 160, an output unit 170, an A/V (audio/video) input unit 180, a driving unit 190. The external input device 200 may be a separate device from the image display device 100, or may be a component of the image display device 100.

Referring to FIG. 1, the tuner 110 may select a radio frequency (RF) broadcast signal, which corresponds to a channel selected by a user, among RF broadcast signals received through an antenna, and convert the selected RF broadcast signal into a medium frequency signal or a baseband image (video)/audio signal. For example, when the RF broadcast signal is a digital broadcast signal, the tuner 110 can convert the RF broadcast signal into a digital IF signal (DIF). On the other hand, when the RF broadcast signal is an analog broadcast signal, the tuner 110 can convert the RF broadcast signal into an analog baseband video/audio signal (CVBS/SIF). The tuner 110 may thus be a hybrid tuner which is capable of processing the digital broadcast signal and the analog broadcast signal.

The digital IF signal (DIF) output from the tuner 110 can be input into the decoder 120, while the analog baseband video/audio signal (CVBS/SIF) output from the tuner 110 can be input into the controller 150. The tuner 110 can receive a signal carrier RF broadcast signal according to an advanced television systems committee (ATSC) standard or a multi-carrier RF broadcast signal according to a digital video broadcasting (DVB) standard.

Although the drawing illustrates one tuner 110, the present invention is not limited to this. The image display device 100 may include a plurality of tuners, for example, first and second tuners. In this instance, the first tuner can receive a first RF broadcast signal corresponding to a broadcasting channel selected by a user, and the second tuner can receive a second RF broadcast signal corresponding to a pre-stored broadcasting channel in a sequential or periodical manner. Similar to the first tuner, the second tuner can convert an RF broadcast signal into a digital IF signal (DIF) or an analog baseband video or audio signal (CVBS/SIF).

The decoder 120 can receive the digital IF signal (DIF) converted by the tuner 110 and decode the received signal. For example, when the DIF output from the tuner 110 is a signal according to the ATSC standard, the decoder 120 can perform 8-vestigal side band (8-VSB) demodulation. Here, the decoder 120 may also perform channel decoding, such as trellis decoding, de-interleaving, reed Solomon decoding and the like. To this end, the decoder 120 may include a trellis decoder, de-interleaver, a reed Solomon decoder and the like.

As another example, when the digital IF signal (DIF) output from the tuner 110 is a signal according to the DVB standard, the decoder 120 can perform a coded orthogonal frequency division modulation (COFDMA) demodulation. Here, the decoder 120 can also perform convolution decoding, de-interleaving, reed Solomon decoding and the like. To this end, the decoder 120 may include a convolution decoder, a de-interleaver, a reed Solomon decoder and the like.

The signal input/output unit 130 can perform signal input and output operations by being connected to an external device. To this end, the signal input/output unit 130 may include an A/V input/output unit and a wireless communication unit.

The A/V input/output unit may include an Ethernet terminal, a USB terminal, a composite video banking sync (CVBS) terminal, a component terminal, a S-video terminal (analog), a digital visual interface (DVI) terminal, a high definition multimedia interface (HDMI) terminal, a mobile high-definition link (MHL) terminal, an RGB terminal, a D-SUB terminal, an IEEE 1394 terminal, a liquid HD terminal and the like. Digital signals input through those terminals may be forwarded to the controller 150. Here, analog signals input through the CVBS terminal and the S-video terminal may be forwarded to the controller after being converted into digital signals through an analog-digital converter.

The wireless communication unit can execute wireless Internet access. For example, the wireless communication unit can execute the wireless Internet access using wireless LAN (WLAN) (Wi-Fi), wireless broadband (Wibro), world interoperability for microwave access (Wimax), high speed downlink packet access (HSDPA) and the like. The wireless communication unit can also perform short-range wireless communication with other electronic devices. For example, the wireless communication unit can perform short-range wireless communication using Bluetooth, radio frequency identification (RFID), infrared data association (IrDA), ultra wideband (UWB), Zigbee and the like.

The signal input/output unit 130 can transfer to the controller 150 a video signal, an audio signal and a data signal, which are provided from external devices, such as a digital versatile disk (DVD) player, a blu-ray player, a game player, a camcorder, a computer (notebook computer), a portable device, a smart phone and the like. Also, the signal input/output unit 130 may transfer to the controller 150 a video signal, an audio signal and a data signal of various media files, which are stored in an external storage device, such as a memory, a hard disk and the like. In addition, the signal input/output unit 130 can output a video signal, an audio signal and a data signal processed by the controller 150 to other external devices.

The signal input/output unit 130 can perform signal input and output operations by being connected to a set-top box, for example, an Internet protocol TV (IPTV) set-top box via at least one of those various terminals. For instance, the signal input/output unit 130 can transfer to the controller 150 a video signal, an audio signal and a data signal, which has been processed by the IPTV set-top box to enable bidirectional communication, and also transfer signals processed by the controller 150 to the IPTV set-top box. Here, the IPTV may include ADSL-TV, VDSL-TV, FTTH-TV and the like which are divided according to a transmission network.

Digital signals output from the decoder 120 and the signal input/output unit 130 may include a stream signal (TS). The stream signal (TS) may be a signal in which a video signal, an audio signal and a data signal are multiplexed. For example, the stream signal (TS) may be an MPEG-2 transport stream (TS) signal obtained by multiplexing an MPEG-2 video signal and a Dolby AC-3 audio signal. An MPEG-2 TS signal may include a 4-byte header and a 184-byte payload.

The interface 140 can receive an input signal for power control, channel selection, screen setting or the like from an external input device 200 or transmit a signal processed by the controller 150 to the external input device 200. The interface 140 and the external input device 200 may be connected to each other in a wired or wireless manner.

As an example of the interface unit 140, a sensor may be provided. The sensor may be implemented as a remote controller to sense the input signal.

A network interface unit provides an interface for connecting the image display device 100 with a wired/wireless network including an internet network. The network interface unit may be provided with an Ethernet terminal, etc., for connection with a wired network. For connection with a wireless network, WLAN (Wireless LAN) (Wi-Fi), Wibro (Wireless broadband), Wimax (World Interoperability for Microwave Access), HSDPA (high speed downlink packet access), etc., may be used.

The network interface unit can access a prescribed web page through a network. That is, the network interface unit can transceive (transmit and receive) data with a corresponding server. The network interface unit can receive content or data provided from a content provider or a network operator. That is, the network interface unit can receive contents such as movies, advertisements, games, VOD, and broadcast signals provided from a content provider or a network provider through a network, and information related thereto.

The network interface unit can receive update information and update files provided from a network operator. The network interface unit can transmit data to an Internet provider, a content provider or a network operator. The network interface unit can select and receive a desired application among applications open to the public, through a network.

The controller 150 can control an overall operation of the display device 100. More specifically, the controller 150 can control generation and output of images. For example, the controller 150 can control the tuner 110 to tune an RF broadcast signal corresponding to a user-selected channel or a pre-stored channel. Further, the controller 150 may include a demultiplexer, a video processor, an audio processor, a data processor, an On screen display (OSD) generator and the like. The controller 150 may include a CPU, a peripheral device, etc., by hardware.

The controller 150 may demultiplex a stream signal (TS), e.g., an MPEG-2 TS signal into a video signal, an audio signal and a data signal. Further, the controller 150 performs image processing, for example, decoding, on an inversely-multiplexed image signal. More specifically, the controller 150 decodes an MPEG-2 standard-encoded image signal by using an MPEG-2 decoder, and decodes an H.264 standard-encoded image signal according to digital multimedia broadcasting (DMB) standard or digital video broadcast-handheld (DVB-H) standards by using an H.264 decoder.

In addition, the controller 150 can perform the imaging processing so that brightness, tint and color of the image signal are adjusted. The image signal, which is image-processed by the controller 150, may be transferred to the display unit 172 or transferred to an external output device through an external output port.

The controller 150 can perform, voice processing, for example, decoding, on an inversely multiplexed voice signal. More specifically, the controller 150 decodes an MPEG-2 standard-encoded voice signal by using an MPEG-2 decoder, decodes an MPEG 4 bit sliced arithmetic coding (BSAC) standard-encoded voice signal according to the DMB standards by using an MPEG 4 decoder, and decodes an MPEG 2 advanced audio coded (AAC) standard-encoded voice signal according to satellite DMB standards or the digital video broadcast-handheld (DVB-H) standards by using an AAC decoder. In addition, the controller 150 can perform base processing, treble processing, and sound volume processing. The voice signal processed by the controller 150 can be transferred to an audio output unit 171, e.g., a speaker, or may be transferred to an external out device.

The controller 150 can process an analog baseband video/audio signal (CVBS/SIF). Here, the analog baseband video/audio signal (CVBS/SIF) input to the controller 150 may be an analog baseband video/audio signal output from the tuner 110 or the signal input/output unit 130. The processed video signal is displayed on the display unit 172, and the processed audio signal is output through the audio output unit 171.

The controller 150 can process, for example, decode a demultiplexed data signal. Here, the data signal may include electronic program guide (EPG) information, which may include broadcast information, such as start time, end time and the like, related to a broadcast program broadcasted on each channel. The EPG information may include ATSC-program and system information protocol (ATSC-PSIP) information and DVB-service information (DVB-SI) information. The ATSC-PSIP information or DVB-SI information may be included in an MPEG-4 TS header (4 bytes).

The controller 150 can perform on-screen display (OSD) processing. In more detail, the controller 150 can generate an OSD signal for displaying various information as graphic or text data based on at least one of a video signal and a data signal or an input signal received from the external input device 200. The OSD signal may include various data such as a user-interface (UI) screen for the image display device 100 and various menu screens, widgets, icons and the like.

The storage unit 160 can store various programs for signal processing and control by the controller 150, and may also store processed video, audio and data signals. The storage unit 160 may include at least one of a flash memory-type storage medium, a hard disc-type storage medium, a multimedia card micro-type storage medium, a card-type memory (for example, SD or XD memory), a random access memory (RAM), a read-only memory (ROM), electrically erasable programmable ROM (EEPROM), a magnetic memory, a magnetic disk and an optical disk.

The output unit 170 is configured to generate output of data in a visible manner, in an audible manner, etc. The output unit 170 includes the audio output unit 171 and the display unit 172. Further, the audio output unit 171 outputs a voice signal processed by the controller 150, e.g., a stereo signal or a 5.1-channel signal. The audio output unit 171 may be implemented in various types of speakers.

The display unit 172 can convert a processed video signal, a processed data signal, and an OSD signal provided by the controller 150 into RGB signals, thereby generating driving signals. Under such configuration, the display unit 172 outputs images. The display unit 172 may be implemented into various types of displays such as a plasma display panel, a liquid crystal display (LCD), a thin film transistor-LCD (TFT-LCD), an organic light-emitting diode (OLED), a flexible display, a three-dimensional (3D) display, an e-ink display and the like. The display unit 172 may also be implemented as a touch screen and may thus be used as an input device.

The A/V input unit 180 is configured to receive an audio or video signal, and may include a camera 181, a microphone 182, etc. The camera 181 processes image frames such as still images or moving images acquired by an image sensor in a video capturing mode or an image capturing mode. The processed image frames may be displayed on the display unit 172.

The image frames processed by the camera 181 may be stored in the memory 160 or transmitted via a radio communication unit. Two or more cameras 181 may be provided according to a user environment. The camera 181 can also capture a user. The camera 181 may be implemented as a single camera or a plurality of cameras. Information on images captured by the camera 181 is input to the controller 150.

For sensing of a user's gesture, a sensing unit, having at least one of a touch sensor, a sound sensor, a position sensor and an operation sensor, may be further provided at the image display device 100. A signal sensed by the sensing unit can be transferred to the controller 150 through the interface unit 140. The controller 150 can sense a user's gesture based on images captured by the camera 181, or based on signals sensed by the sensing unit, or by combination of them.

The microphone 182 receives sounds (audible data) via a microphone in a phone call mode, a recording mode, a voice recognition mode, and the like, and processes such sounds into electric voice data. The microphone 182 may implement various types of noise canceling (or suppression) algorithms to cancel (or suppress) noise or interference generated when receiving and transmitting audio signals.

When the display unit 170 is implemented as a flexible display, the driving unit 190 applies a force so that at least part of the flexible display can be transformed. A method for applying a force will be explained with reference to FIGS. 5 and 7.

A power supply unit supplies electric power to the image display device 100. Specifically, the power supply unit supplies electric power to the controller 150 that is realized in the form of a system-on chip (SOC), the display unit 172 for displaying an image, and the audio output unit 171 for outputting audio.

To do this, the power supply unit may include a converter that converts DC power into AC power. For example, if the display unit 172 is realized as a liquid crystal panel including multiple backlight lamps, the power supply unit may further include an inverter in which a PWM operation is possible for brightness variability and dimming drive.

The external input device 200 is connected to the interface unit 140 by a cable or wirelessly, and transmits an input signal that is generated according to a user input, to the interface unit 140. The external input device 200 may include a remote controller, a mouse, a keyboard, and the like. The remote controller transmits an input signal to the interface unit 140 by using Bluetooth communication, RF communication, IR communication, ultra wideband (UWB) communication, ZigBee communication, or the like. The remote controller may be implemented as a spatial remote controller. The spatial remote controller may generate an input signal by detecting a movement of a main body.

The image display device 100 may be realized as a fixed type digital broadcast receiver for receiving at least one of an ATSC type (8-VSB type) digital broadcast, a digital broadcast, a DVB-T type (COFDM type) digital broadcast, and an ISDB-T type (BST-OFDM type) digital broadcast. Alternatively, the image display device 100 may be realized as a mobile type digital broadcast receiver for receiving at least one of a ground wave DMB type digital broadcast, a satellite DMB type digital broadcast, an ATSC-M/H type digital broadcast, a DVB-H type (COFEM type) digital broadcast, and a media forward link-only type digital broadcast. Alternatively, the image display apparatus 100 may be implemented as a digital broadcast receiver for cable communication, satellite communication or IPTV.

Figure 2:
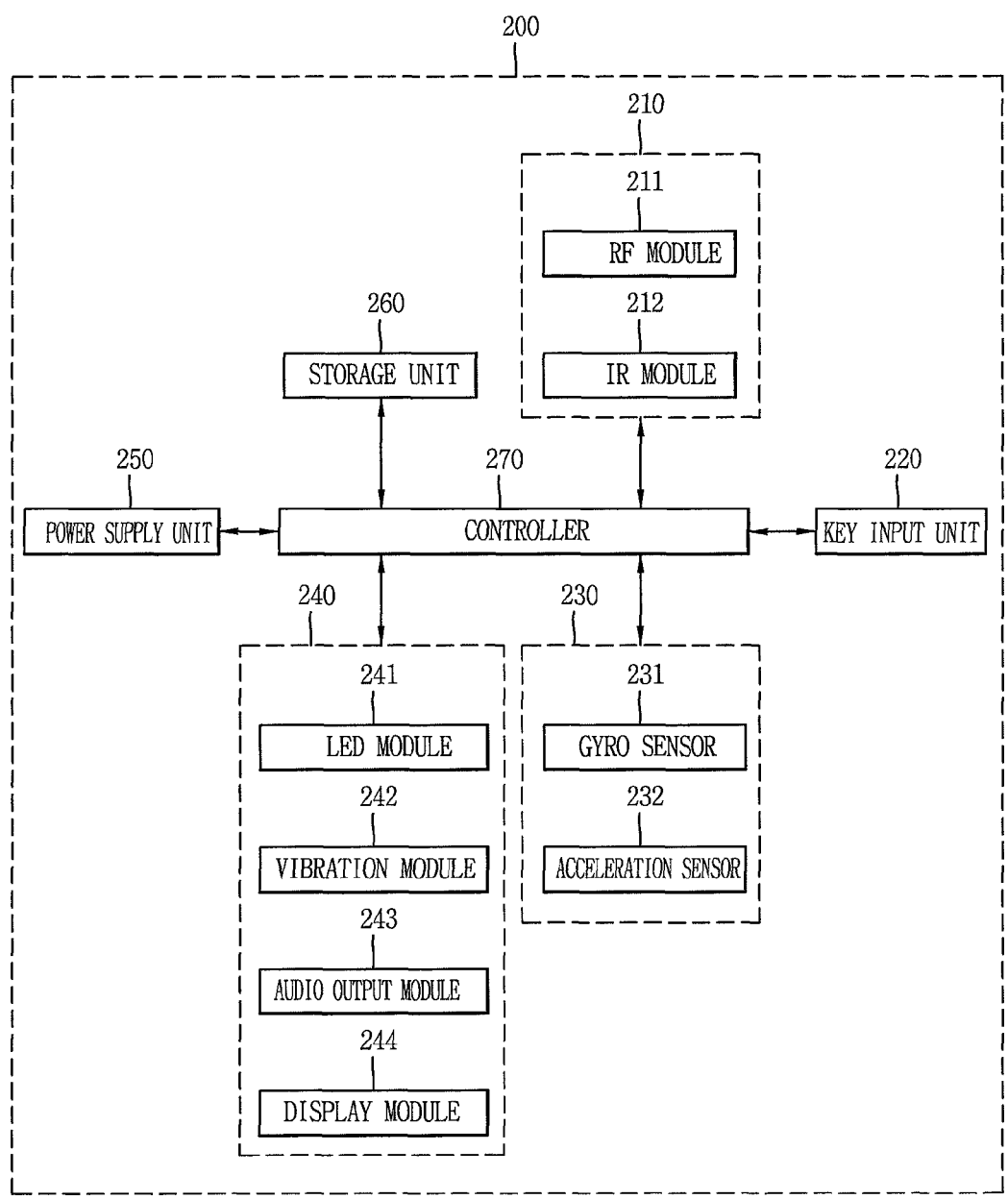
FIG. 2 is a block diagram illustrating in detail the external input device in FIG. 1.

Next, FIG. 2 is a block diagram illustrating the external input device 200 of FIG. 1 in detail. The external input device 200 includes a wireless communication unit 210, a user input unit 220, a sensing unit 230, an output unit 240, a power supply unit 250, a storage unit 260 and a controller 270.

Referring to FIG. 2, the wireless communication unit 210 can transmit a signal to the image display device 100 or receive a signal from the image display device 100. To this end, the wireless communication unit 210 includes an RF module 211 and an IR module 212. The RF module 211 may transmit and receive signals according to an RF communication standard by being connected to the interface 140 of the image display device 100. The IF module 212 can transmit and receive signals according to an IF communication standard by being connected to the interface 140 of the image display device 100.

The user input unit 220 may include as an input element a keypad, a key button, a scroll key, a jog key and the like. The user may manipulate the user input unit 220 to input (enter) commands (instructions) related to the image display device 100. The command, for example, may be entered as a user pushes a hard key button of the user input unit 200.

The sensing unit 230 may include a gyro sensor 231 and an acceleration sensor 232. The gyro sensor 231 may sense a spatial movement of the external input device 200 based on X, Y and Z axes. The acceleration sensor 232 may sense a moving speed of the external input device 200 and the like.

The output unit 240 may output information in response to manipulation of the user input unit 230 and information corresponding to a signal sent by the image display device 100. Therefore, a user can recognize a manipulation state of the user input unit 230 or a control state of the image display device 100 through the output unit 230. For example, the output unit 240 may include an LED module 241 which is turned on and off, a vibration module 242 which generates vibration, an audio output module 243 which outputs sound, and a display module 244 which outputs images, in response to manipulation of the user input unit 230 or transmission and reception of signals through the wireless communication unit 210.

The power supply unit 250 can supply power to various electronic elements of the external input device 200. The power supply of the power supply unit 250 may be stopped when the external input device 200 does not move for a predetermined time, thereby reducing power consumption. The power supply unit 250 may resupply power when a predetermined key of the external input device 200 is manipulated.

The storage unit 260 can store various programs, which are involved with control and operations of the external input device 200, applications, frequency band information and the like. The controller 270 may execute an overall control operation of the external input device 200.

Figure 3:
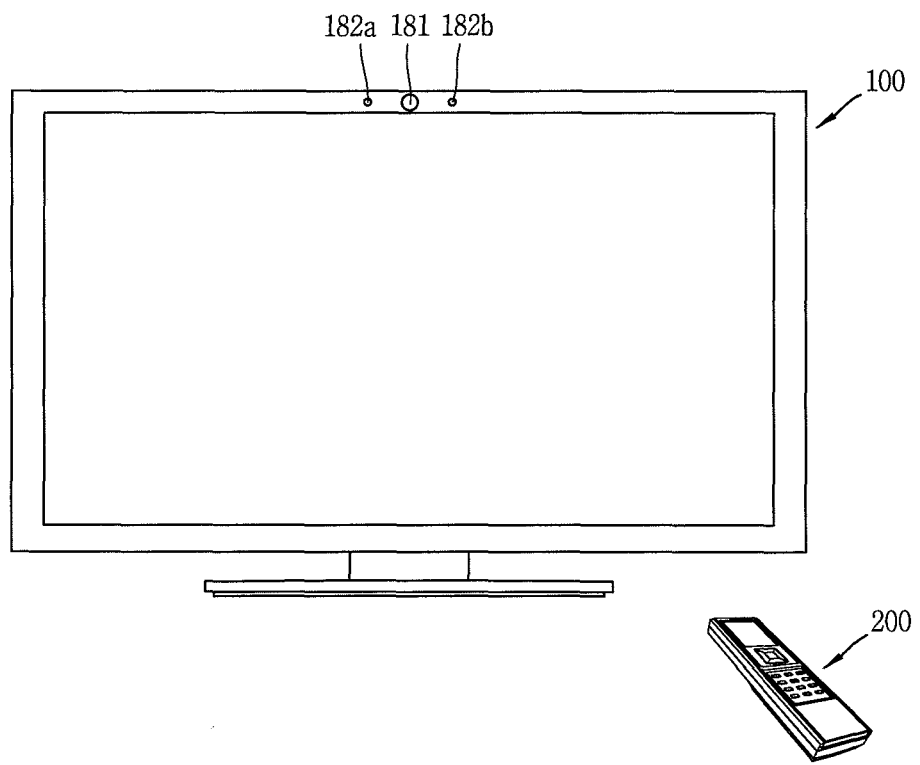
FIG. 3 is a diagram illustrating a relationship between operation of the image display device according to an embodiment of the present invention and operation of the external input device.

FIG. 3 is a conceptual view illustrating reciprocal operations of the image display device 100 and the external input device 200 according to an embodiment of the present invention. The image display device 100 is implemented as a TV receiver, and the external input device 200 is implemented as a remote controller.

Referring to FIG. 3, the external input device 200 can transmit and receive a signal to/from the image display device 100 according to an RF communication standard. A control menu may be displayed on a screen of the image display device 100 according to a control signal of the external input device 200. The external input device 200 may be provided with a plurality of buttons, and may generate an external input signal according to a user's operation to manipulate buttons.

If the display unit 170 is configured from a flexible display, the drive unit 190 applies force so that at least one part of the flexible display is transformed.

An image display device 100 according to the embodiment of the present invention is illustrated as including one camera 181 and the multiple microphones 182a and 182b in FIG. 3, but this corresponds to one embodiment. That is, depending on the embodiment, one camera 181 may be provided or may not be provided, and depending on the embodiment, at least one microphone 182 may be provided or may not be provided.

Figure 4:
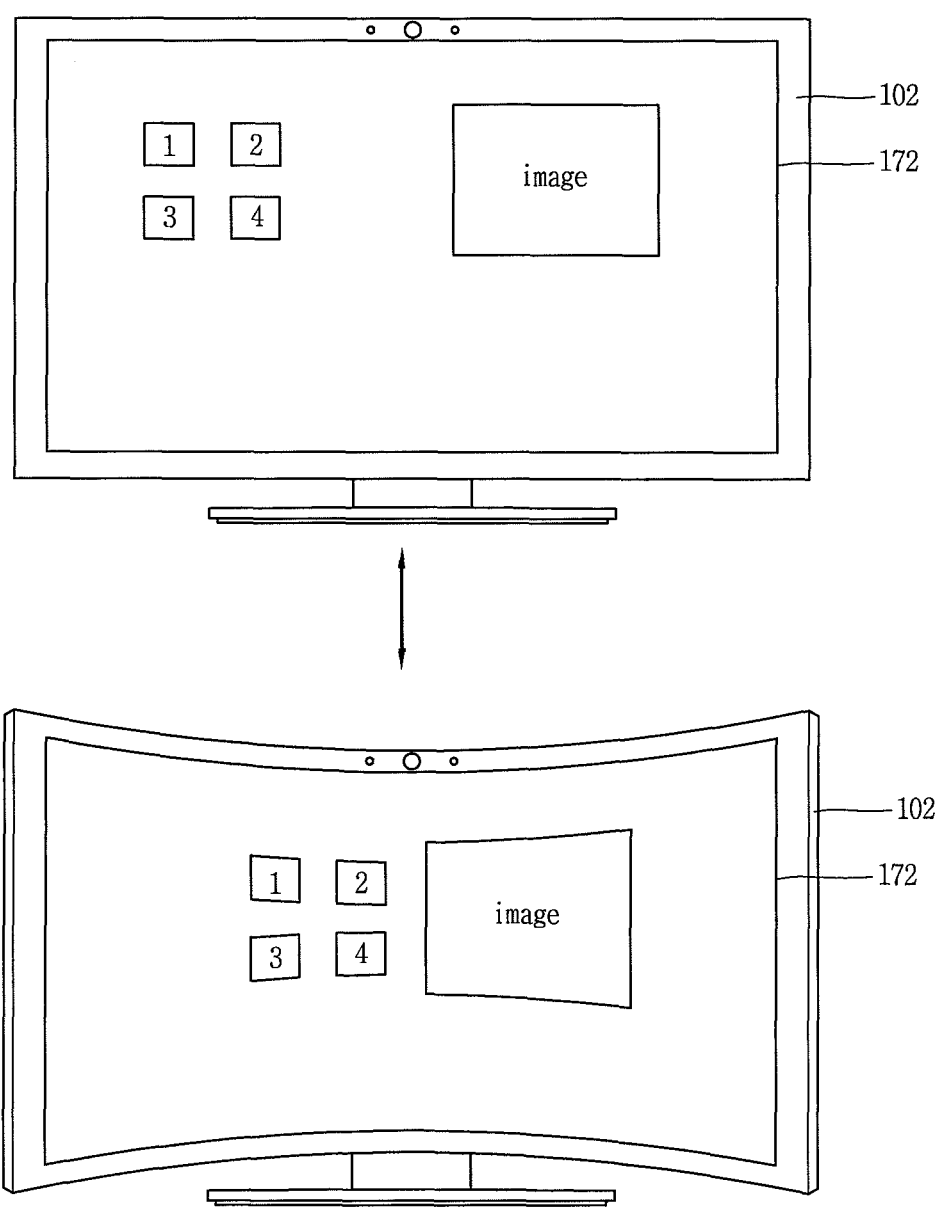
FIG. 4 is a diagram illustrating a flexible display unit included in the image display device according to one embodiment of the present invention.

On the other hand, according to an embodiment of the present invention, information processed by the image display device 100 is displayed using the flexible display. A flexible display unit is described in detail below referring to the accompanying drawings. FIG. 4 is a diagram illustrating a flexible display unit 172 included in an image display device 100 according to one embodiment of the present invention.

As illustrated in FIG. 4, the flexible display unit 172 includes a display that can be by force bent, warped, folded, or rolled. Further, the flexible display unit 172 includes both a general flexible display and electronic paper.

In more detail, the general flexible display corresponds to a lightweight, unbreakable, robust display which is manufactured using a flexible substrate that can be bent, warped, folded, or rolled like a sheet of paper, and which still maintains display characteristics of the existing flat display.

In addition, the electronic paper results from application of a display technology using general characteristics of ink and differs from a general flat display in that it uses reflection right. The electronic paper changes pictures and letters using electrophoresis using a capsule, or using a twist ball.

Further, the sensing unit 151 (refer to FIG. 1) is included in the flexible display unit 172 and thus detects information relating to a bent state of the flexible display unit 172. The word "bent" in the present specification means "being warped," "being rolled," "being folded," or "being curved," for example.

The sensing unit 151 is arranged on the entire flexible display unit 172 or on a portion of the flexible display unit 172 and detects the information relating to the bent state of the flexible display unit 172. Further, the information relating to the bent state of the flexible display unit 172 includes a bending direction, bending extent, and a bending position of the flexible display unit 172 and acceleration at which the bent flexible display unit returns back to its original shape, and further includes various types of information that can be detected in relation to the bent state of the flexible display unit.

In addition, the controller 150 changes information displayed on the flexible display unit 172 or generates a control signal for controlling a function performed by the image display device 100, based on the information relating to the bent state of the flexible display unit 172 detected by the sensing unit 151.

For example, if the flexible display unit 172 is bent by force as illustrated in FIG. 4, the controller 150 rearranges, separates, or combines screen images already displayed on the flexible display unit 172 or changes a curvature, depending on the bending direction and a bending angle of the flexible display unit 172 and the returning acceleration at which the bent flexible display unit returns back to its original shape.

As one example, if the flexible display unit 172 is bent inward by force as illustrated in FIG. 4, the controller 150 causes the images displayed on the flexible display unit 172 to be displayed so as to get close to one another. In addition, conversely, if the flexible display unit 172 is bent outward by force, the screen images displayed on the flexible display unit 172 are displayed so as to move away from one another.

In addition to the ways above described, the controller 150 variously controls the way to display the information on the flexible display unit 172 so the user accurately can recognize the information displayed on the flexible display unit 172, corresponding to the bent state of the flexible display unit.

Then, the image display device 100 according to an embodiment of the present invention that includes the flexible display unit 172 that encloses the flexible display unit 172 as illustrated in FIG. 4. In addition, the main body 102 is configured considering characteristics of the flexible display unit 172, so the main body 102 is bent by external physical force together with the flexible display unit 172.

Further, the image display device 100 according to an embodiment of the present invention transforms at least one part of the flexible display unit 172 using the drive unit 190 (refer to FIG. 1). The drive unit 190 is described in more detail below referring to FIGS. 5 and 7.

Figure 5:
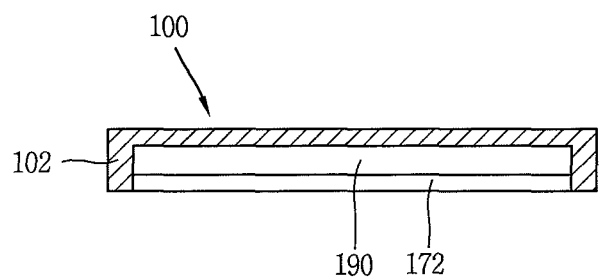
FIG. 5 is a vertical cross-sectional diagram of the image display device according to one embodiment of the present invention.

FIG. 5 is a vertical cross-sectional diagram of the image display device 100 according to one embodiment of the present invention. Referring to FIG. 5, in the image display device 100, the drive unit 190 is positioned between the flexible display unit 172 and the main body 102. The drive unit 190 is positioned in at least one region between the flexible display unit 172 and the main body 102 and at least one drive unit 190 is provided in various directions in which the flexible display unit 172 is transformed.

In addition, a touch input unit is further provided on the front side or the rear side of the flexible display unit 172 to receive a touch input from the user. Then, a back cover is formed on the rear side of the flexible display unit 172 to prevent the flexible display unit 172 from warping. For example, the back cover is made of material such as carbon fiber reinforced plastics (CFRP), or is in the shape such as a honeycomb, and this prevents the flexible display unit 172 from warping and transfers force to the flexible display unit 172, resulting in providing suitable bending. Because the back cover can also be bent, the drive unit 190 is formed on the rear side of the back cover and transforms the flexible display unit 172.

The drive unit 190 is a constituent element for transforming at least one part of the flexible display unit 172. The drive unit 190 includes a thermal transformation member, a motor, a shape-memory alloy, and an ionic layer. That is, the drive unit 190 includes all constituent elements for applying force to at least one part of the flexible display unit 172.

According to the embodiment, the thermal transformation member is formed on the rear side of the flexible display unit 172 by applying a coating material to the rear side of the flexible display unit 172, or is formed on the rear side of the flexible display unit 172 by laminating a thin film formed in the shape of a band on the rear side of the flexible display unit 172. Force is applied to the flexible display unit 172 by providing heating or cooling to the thermal transformation member.

A bimetal is used as one example of the thermal transformation member. The bimetal is made by stacking two metals, each with a different thermal expansion coefficient. When heat is applied to the bimetal and thus temperature of the bimetal is increased, the bimetal is bent to the metal with the lower thermal expansion coefficient and thereafter when the temperature is decreased, the bimetal returns to its original state. An alloy of nickel and iron is used as the metal with the lower thermal expansion coefficient, that is, a metal that is not well expandable. An alloy of nickel and manganese, and iron, an alloy of nickel and manganese, and copper, or an alloy of nickel and molybdenum, and iron, is used as the metal with the higher thermal expansion coefficient, that is, a metal that is well expandable.

According to the embodiment, the drive unit 190 is configured from the ionic layer. As one example of the ionic layer, an ionic polymer-metal composite layer (an IPMC layer) is used. The ionic polymer-metal composite layer changes in shape depending on an applied voltage. As the ionic polymer-metal composite layer changes in shape, force is applied to at least one part of the flexible display unit 172.

In association with the drive unit 190, a case is described above in which the thermal transformation member of which the length is transformed by heat and the ionic polymer-metal composite layer that contracts and expands depending on the applied voltage are used, but the present invention is not limited to the case described above. For example, the drive unit 190 may be formed so that the drive unit 190 has a structure in which the flexible display unit 172 is transformed using rotatory power produced by the motor, or the flexible display unit 172 is transformed by causing an air bag to expand or contract using pneumatic pressure.

Figure 6:
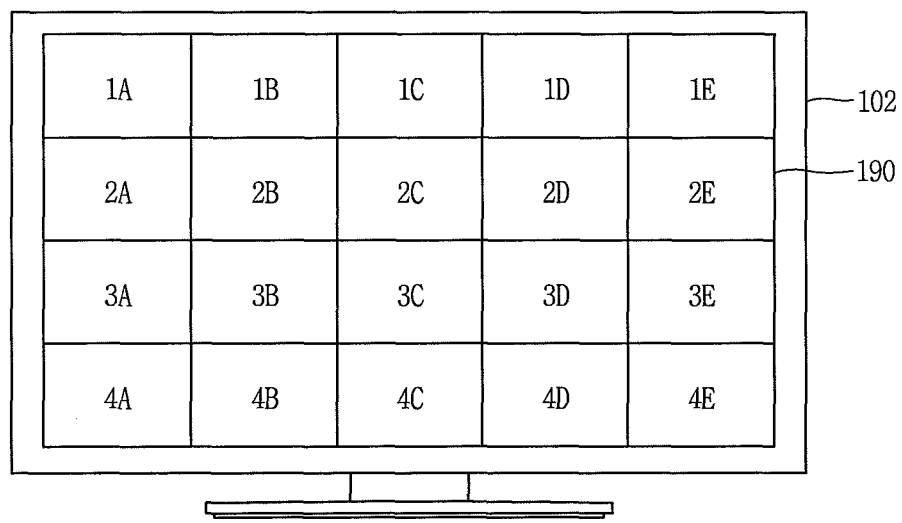
FIG. 6 is a diagram illustrating a structure of a drive unit in the image display device according to one embodiment of the present invention.

Next, FIG. 6 is a diagram illustrating the structure of the drive unit 190 in the image display device 100 according to one embodiment of the present invention. According to the embodiment, the drive unit 190, the multiple drive units 190, each of which is described above referring to FIG. 5, are formed in the shape of a lattice (each drive unit 190 is in the shape of a cell) and are installed on the rear side of the flexible display unit 172. Then, the controller 190 controls each of the multiple drive units and thus arbitrarily transforms a shape of the flexible display unit 172.

That is, the controller 150 causes the drive units 190 to operate in a unit of a cell, in a unit of a row, or in a unit of a column. Then, the controller 150 sets a basic axis that serves as a basis for transformation, and thus variously transforms the flexible display unit 172. For example, the controller 150 sets both of the first column and the first row to be the basic axis and transforms only a portion of the display unit 172 that corresponds to "1A." As another example, the controller 150 sets the second column to be the basic axis and makes division into the left portion and the right portion with the second column as the basic axis. Thus, the controller 150 bends the left portion and the right portion at different angles.

Figure 7:
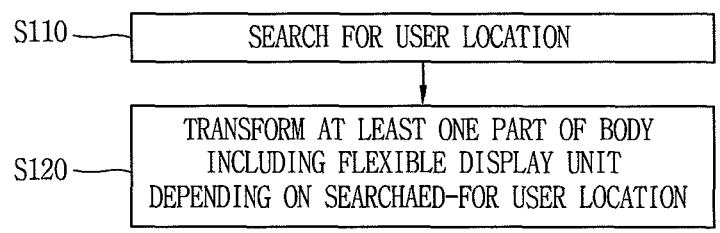
FIG. 7 is a flowchart illustrating a method in which the image display device transforms at least one part of the flexible display unit.

A method in which the image display device 100 described above transforms at least one part of the flexible display unit 172 is described in more detail below referring to the accompanying drawings. FIG. 7 is a flowchart illustrating the method in which the image display device 100 transforms at least one part of the flexible display unit 172. FIG. 8 and FIGS. 9A to 9C are diagrams illustrating the flowchart in FIG. 7.

First, the controller 150 searches for a user location (S110). The user means at least one person who is positioned within a short distance to watch the image display device 100. A method of searching for the user, for example, includes a method of analyzing an image captured by the camera, a method of analyzing a difference in time between audio signals received through the first and second microphones, and a method of analyzing a signal received from an external device. The method of searching for the user is described in detail below referring to FIGS. 11 to 13.

On the other hand, only when an event occurs, the controller 150 searches for the user location in order to search for the user location in real time or efficiently consume electric power. Further, the "event" is when at least one part of the flexible display unit 172 has to be transformed, such as when the electric power is applied to the powered-off image display device 100 and thus the image display device is powered on, when a control command for performing a transformation function is input, or when a predetermined period set for searching for the user repeats (for example, when 30 minutes has elapsed after searching for the user).

When the user is searched for, at least one part of the flexible display unit 172 is transformed depending on the searched-for user location (S120). That is, the controller 150 determines whether or not to transform at least one part of the flexible display unit 172, depending on whether or not the user is searched for. That is, if the user is searched for by using flexibility characteristics of the flexible display unit 172, the controller 172 transforms the flexible display unit 172, based on the searched-for user location.

At this point, a transformation state of the flexible display unit 172 varies depending on the user location. That is, at least one of a transformation portion of the flexible display unit 172, a transformation direction and an extent of transformation varies depending on the user location, and the extent of transformation is numerically expressed depending on a curvature or a bending angle.

The transformation state dependent on the user location is calculated by the controller 150 or is stored in the storage unit 160 (refer to FIG. 1). If the transformation state dependent on the user location is stored in the storage unit 160, the transformation state is set to be a state of providing a sense of a suitable immersion at the user location. The contents that are to be stored in the storage unit 150 is stored by a manufacturer at the time of shipment and is edited or updated by the manufacturer or the user.

Figure 8:
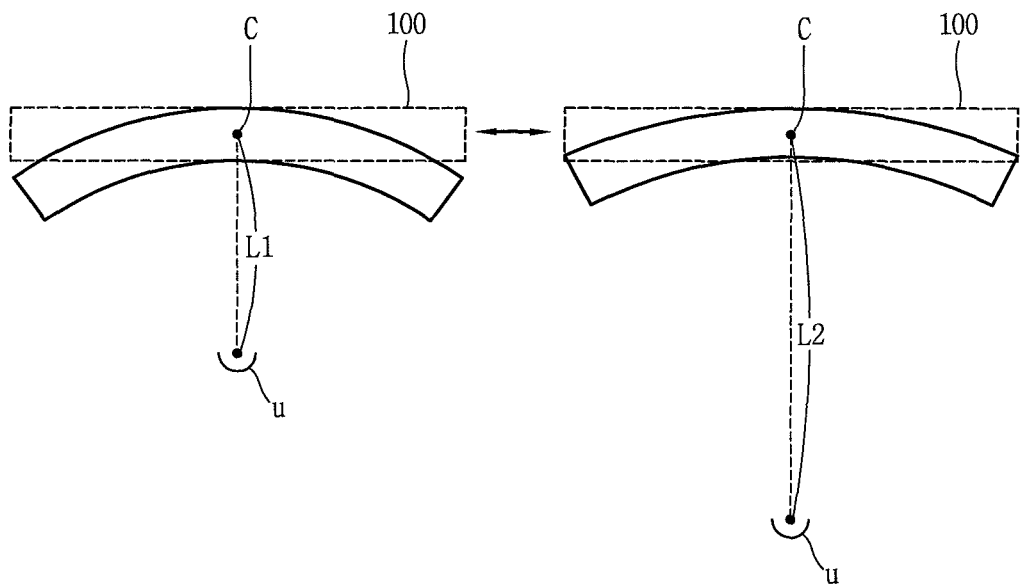
FIG. 8 is a diagram illustrating the flowchart in FIG. 7.

Next, FIG. 8 is a diagram illustrating the transformation state of the flexible display unit 172 that varies depending on a distance from the image display device 100 according to the embodiment of the present invention to the user. If the searched-for user "u" is positioned in a straight line with the center "c" of the mobile terminal, the transformation state of the flexible display unit 172 varies depending on a distance between the center "c" of the mobile terminal and the searched-for user "u."

In order for the flexible display unit 172 to get bent in the shape of a curved surface similar to that of a human eye, the closer the searched-for location of the user "u" is to the display unit 172, the greater the curvature has to be with respect to at least one part of the flexible display unit 172. That is, the farther the searched-for user location is away from the image display device 100, the smaller the curvature is with respect to at least one part of the flexible display unit 172. It is apparent from FIG. 8 that because "L1" is smaller than "L2," the flexible display unit 172 is transformed to a greater curvature in the case of "L1" than in the case of "L2."

Figure 9A:
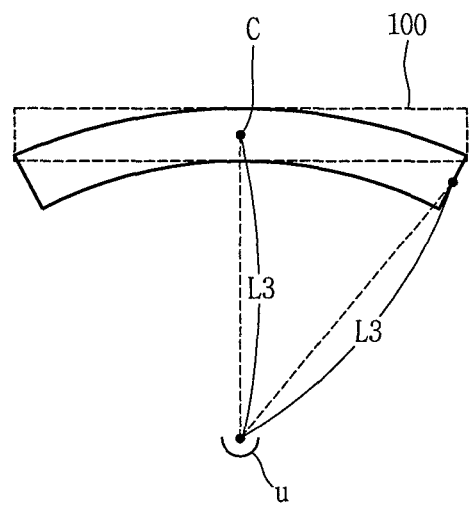
FIGS. 9A to 9C are diagrams illustrating the flowchart in FIG. 7.

Referring to FIG. 9A, the controller 150 transforms at least one part of the flexible display unit 172 so that a constant distance is maintained between an entire region of the flexible display unit 172 and the searched-for location of the user "u". Accordingly, a phenomenon in which recognizability of the edge portion is decreased is reduced because an area of a screen that is recognized by the human eye increases and a distance from the human eye to the center "c" of the screen becomes the same as a distance from the human eye to the lateral side.

Figure 9B:
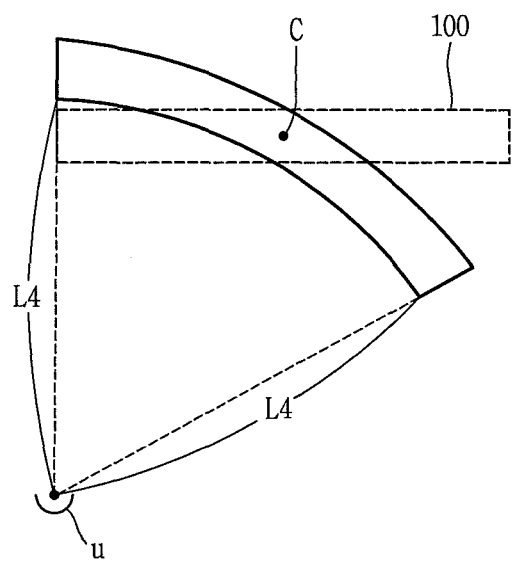

Referring to FIGS. 9A and 9B, even though the distance between the searched-for user "u" and the center "c" of the image display device 100 is the same as the distance from the human eye to the lateral side, the transformation state of the flexible display unit 172 varies depending on where the searched-for user "u" is.

Figure 9C:
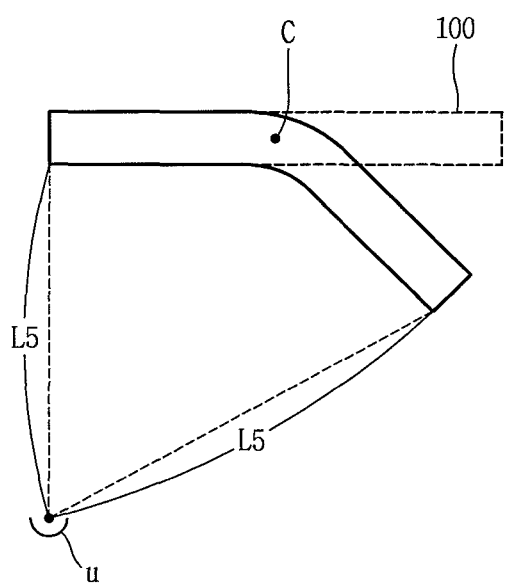

In addition, referring to FIG. 9C, the controller 150 bends the flexible display unit 172 so that at least one part of the flexible display unit 172 gets closer to the searched-for location of the user "u". That is, one region, not the entire region, of the flexible display unit 172 is transformed. This is done to create the state of providing the sense of the suitable immersion.

The transforming of at least one part of the flexible display unit 172 in a direction parallel to the ground is described above, but the flexible display unit 172 can be transformed not only in the direction parallel to the ground, but also in the direction vertical to the ground. That is, the flexible display unit 172 can be transformed in various directions by the drive unit 190 (refer to FIG. 1).

A method in which the image display device 100 described above searches for the user is described in more detail below referring to FIGS. 10 to 14.

Figure 10:
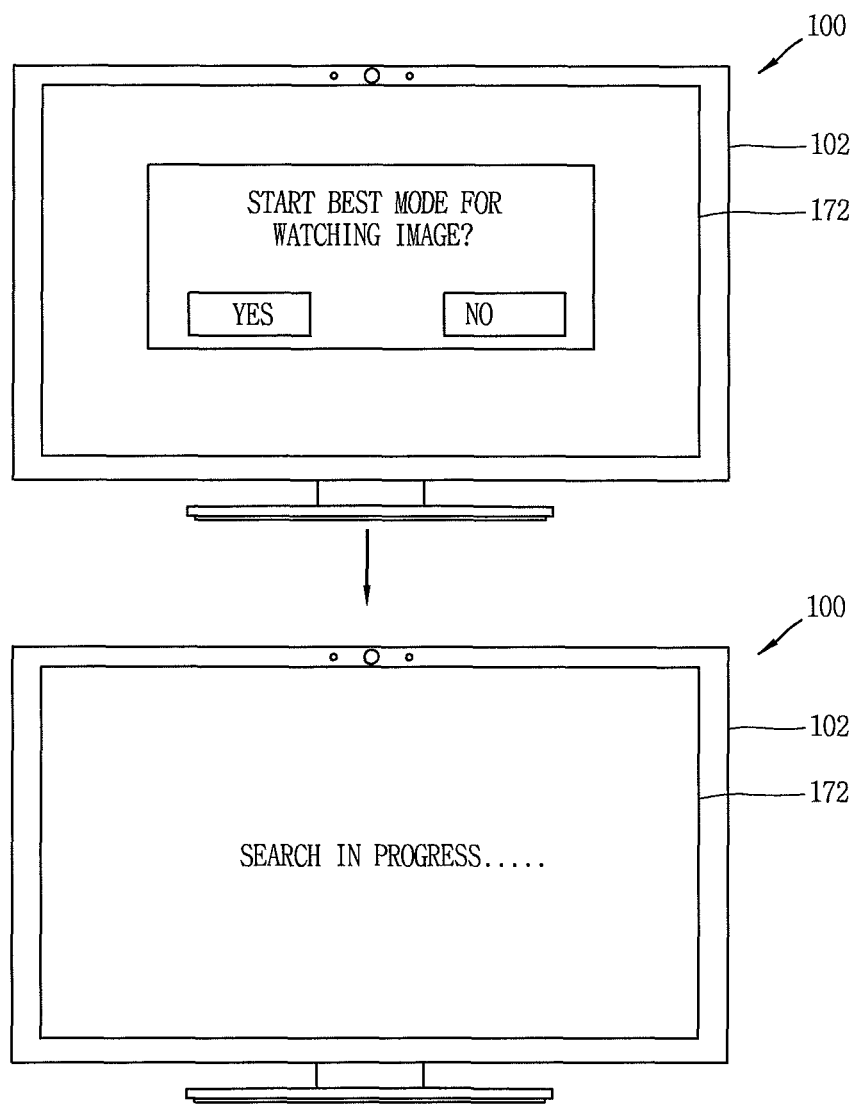
FIG. 10 is a diagram illustrating a method in which a user is searched for in the image display device according to one embodiment of the present invention.

FIG. 10 is a diagram illustrating the image display device 100 in the case of an occurrence of the event described referring to FIG. 7. Referring to FIG. 10, if an event for transforming the flexible display unit 172 (for example, a power-on event) occurs, the controller 150 according to an embodiment of the present invention outputs a pop-up window that is dependent on the occurrence of the event. At this point, a "best mode" means a mode in which at least one part of the flexible display unit 172 is transformed or will be transformed so as to provide the feel of suitable immersion at the user location.

By responding to the pop-up window, the user determines whether or not at least one part of the flexible display unit 172 is selectively transformed. At this point, the user uses various input methods. For example, the user inputs "Yes," or "No" using voice recognition or provides an input using the external input device 200 (refer to FIG. 1). If the flexible display unit 172 is configured from a touch screen, the user uses the touch input. This is done to check whether or not the user desires to be provided with an environment in which the flexible display can provide an improved sense of immersion.

Figure 11:
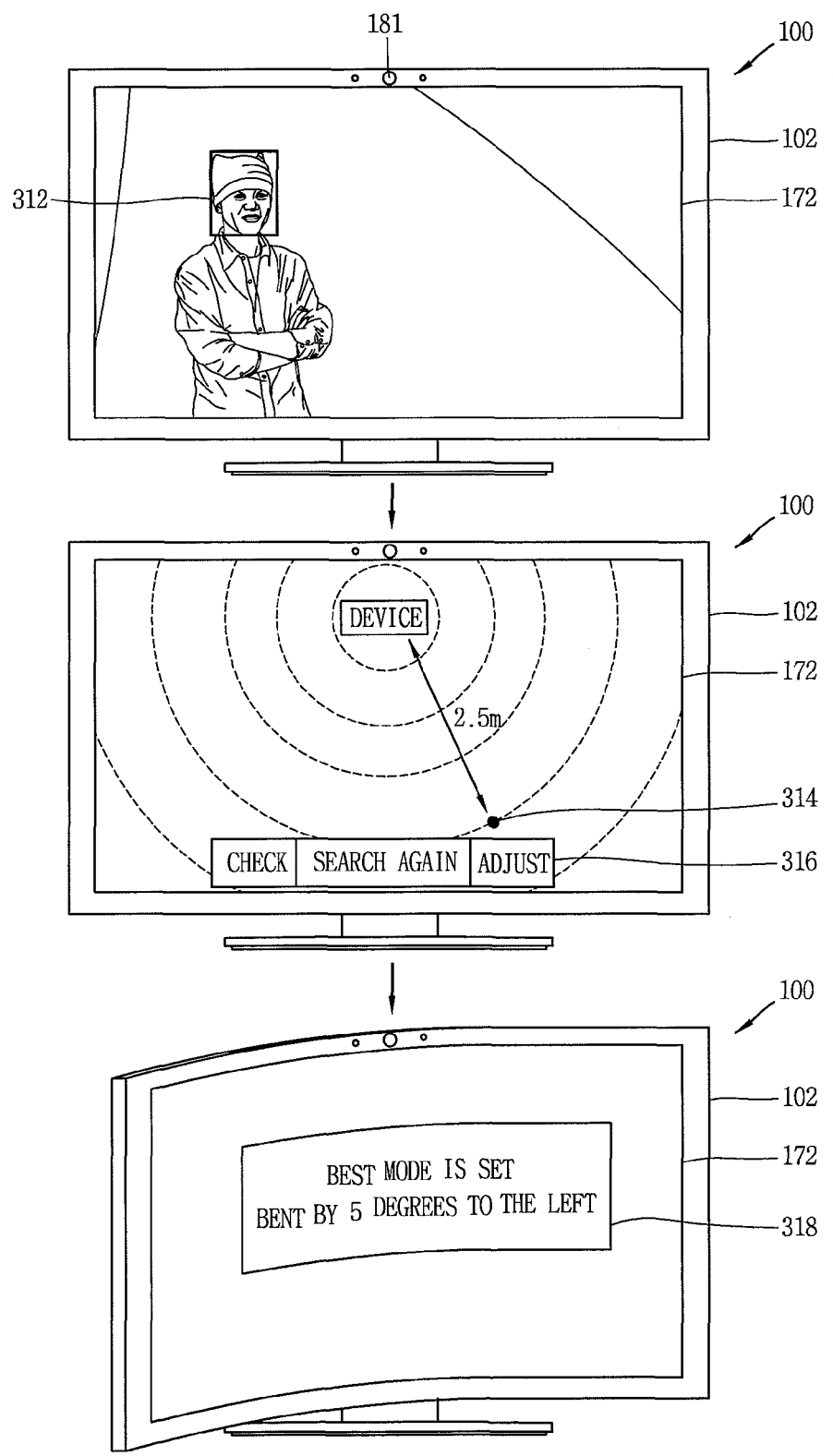
FIG. 11 is a diagram illustrating the method in which the user is searched for in the image display device according to one embodiment of the present invention.

FIG. 11 is a diagram illustrating a method of searching for the user using the camera according to the embodiment. Referring to FIG. 11, the controller 150 captures an image using the camera 181 of the image display device 100 which searches for the user using the captured image. For example, a region that is presumed to be a face is searched for using a distinctive portion of the face such as an eye, a nose, and a mouth, and the searched-for region is determined to correspond to the user location. In embodiments of the present invention, the camera 181 can be mounted on the main body 102. However, such is not required, and the camera 181 can be included in any portion of the image display device 100, including the flexible display unit 172. Also, in embodiments of the present invention, the microphone 182 can be mounted on the main body 102. However, such is not required, and the microphone 182 can be included in any portion of the image display device 100, including the flexible display unit 172.

The searched-for user location is calculated using a size and a location of the region that is presumed to be the face in the entire image captured by the camera 181. At this point, two or more of the cameras are used to make a more precise search.

Then, the controller 150 searches for the eyes of the user and bends at least one part of the flexible display unit 172 considering a field of view that is dependent on the location of the eyes. That is, the flexible display unit 172 is bent so that the field of view covers a broader area.

Further, if the user is searched for, the controller 150 outputs the image captured by the camera 181 on the flexible display unit 172 and outputs a graphic object 312 to the searched-for user location along with the image. The user can check whether or not the precise search is made, using the image and the graphic object 312 that are output.

Furthermore, the controller 150 outputs information 314 on the searched-for user location to the flexible display unit 172. The location information includes information relating to the distance between the image display device 100 and the user and to the direction in which the user is searched for with respect to the image display device 100. The user location 314 and location "DEVICE" of the image display device are visually output using a picture (hereinafter referred to as a "map") in which a space is scaled down and is expressed in one plane.

In addition, the controller 150 outputs a menu 316 corresponding to the location information along with the location information. For example, the menu 316 includes at least one of "check," "search again," and "adjust."

The "check" is a menu for approving the transformation of the flexible display unit 172, based on the searched-for user location, and the "search again" is a menu for searching for the user location once more. The "adjust" is a menu for changing the searched-for user location.

When the "adjust" menu is selected, the user location is adjusted in a state where the map and the user location are output. For example, the user location 314 that is output on the map is moved using a wheel or a directional button of the external input device 200. As another example, if the flexible display unit 172 is configured from the touch screen, the user location is moved to a point at which the touch input is received and a point that corresponds on the map.

Figure 12:
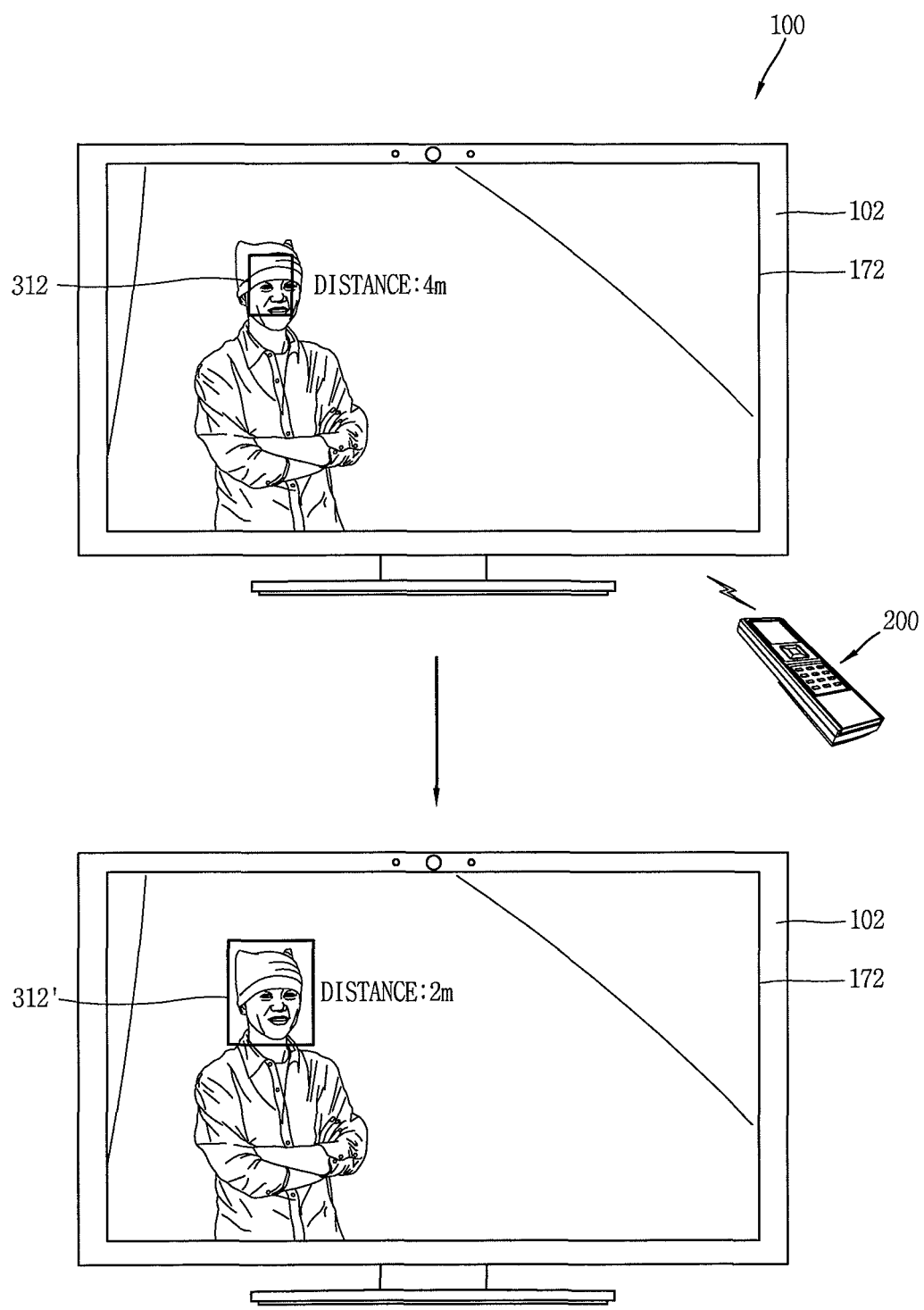
FIG. 12 is a diagram illustrating the method in which the user is searched for in the image display device according to one embodiment of the present invention.

Additionally, referring to FIG. 12, the user location is adjusted using the graphic object 312 that is output along with the image. For example, the "adjust" menu is selected, the flexible display unit 172 outputs the graphic object 312 along with the image, and at this point, the user can change at least one of a location and a size of the graphic object using the wheel and the directional button of the external input device 200 (312->312').

Further, the controller 150 transforms the flexible display unit 172, based on the user location 312' that results from the adjustment by the user input, not on the user location 312 searched for by the controller 150.

When the user location is confirmed, the controller 180 transforms at least one part of the flexible display unit 172, based on the confirmed user location. When the transformation of the flexible display unit 172 is completed, the controller 150 outputs transformation information 318 relating to the flexible display unit 172 on the flexible display unit 172. The transformation information means information relating to the transformation portion of the edge portion of the flexible display unit 172, the transformation direction, and the extent of transformation, and the extent of transformation is numerically expressed depending on the curvature and the bending angle.

Figure 13:
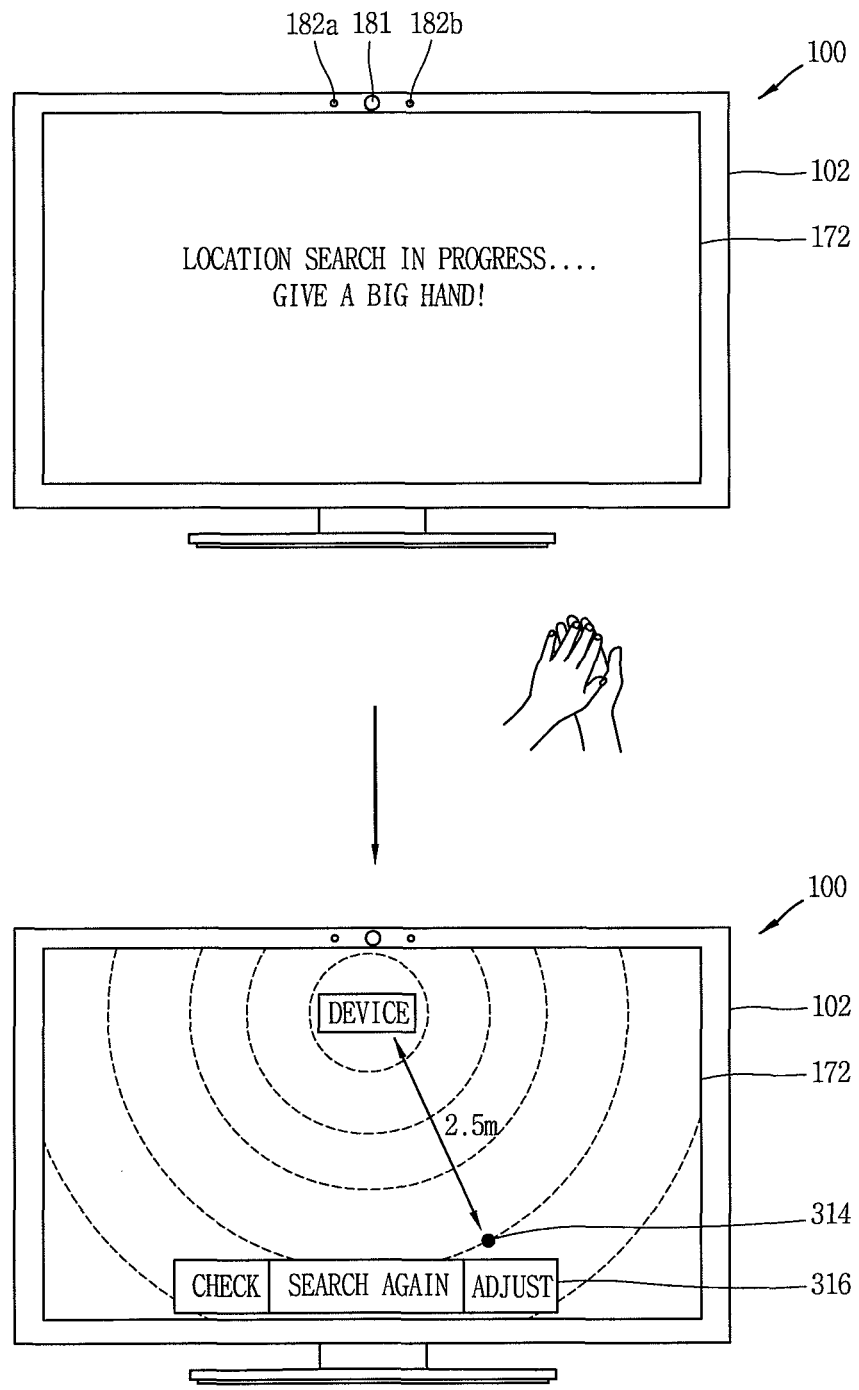
FIG. 13 is a diagram illustrating the method in which the user is searched for in the image display device according to one embodiment of the present invention.
Figure 14:
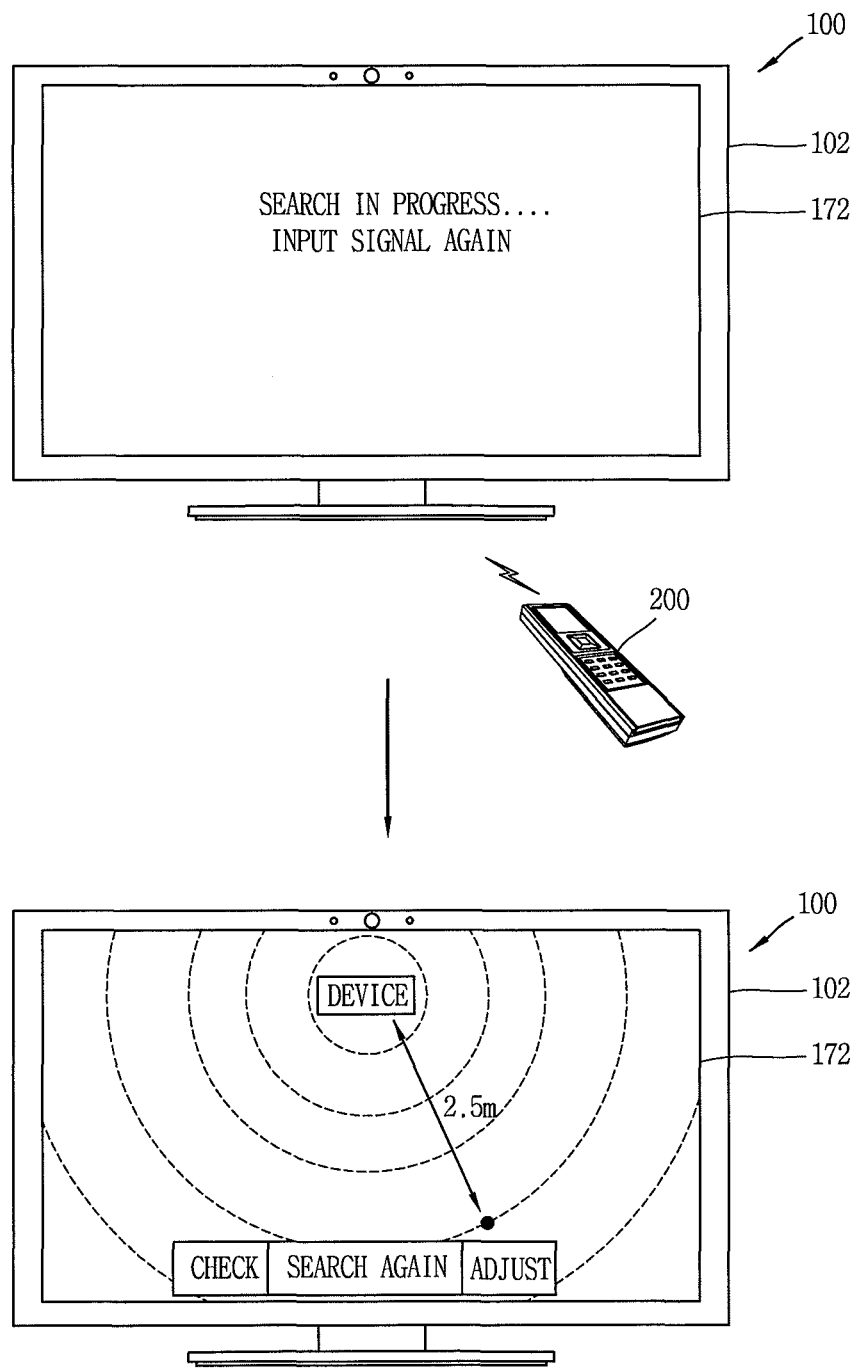
FIG. 14 is a diagram illustrating the method in which the user is searched for in the image display device according to one embodiment of the present invention.

Next, FIG. 13 is a diagram illustrating a method in which the user is searched for using first and second microphones 182a and 182b, according to the embodiment. At least two of the image display devices 100 according to an embodiment of the present invention are arranged on the main body 102. The first and second microphones 182a and 182b are arranged with spacing in between, and the controller 150 searches for the user using audio signals received in the first and second microphones 182a and 182b.

Because the first and second microphones 182a and 182b are arranged with the spacing in between, the audio signals generated at the same point are received in the first and second microphones 182a and 182b at different times. Because a speed of sound is constant, the user location is searched for using delay in time between the audio signals received in the first and second microphones 182a and 182b.

Further, the controller 150 outputs a guide message (for example, "Give a big hand!") for providing the more precise search. In a state in which the guide message is output, the user is searched for with more precision using the audio signal that is received within a reference time.

Figure 17:
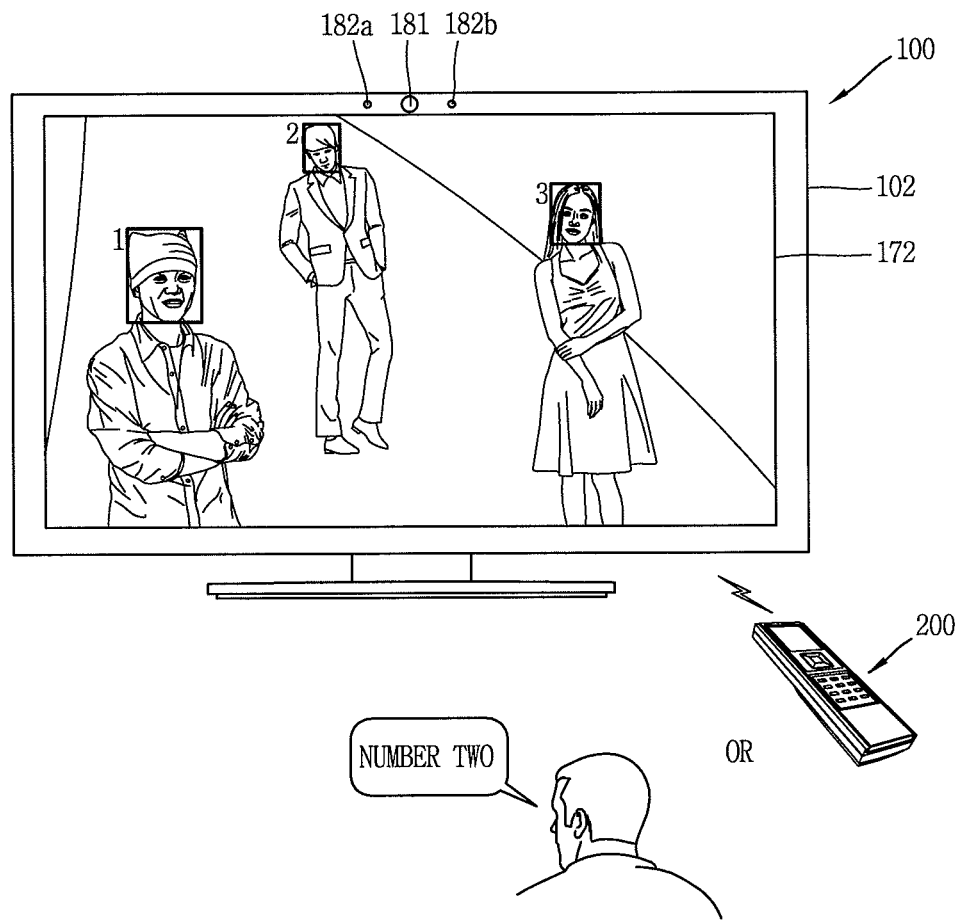

FIG. 17 is a diagram illustrating a method in which the user is searched for using the external input device 200, according to the embodiment. The external input device 200 includes any device that transmits a control signal to the image display device 100, and a remote controller and the mobile terminal are examples of the external input device 200. Because the control signal transmitted using infrared rays, the location from which the infrared rays are emitted is determined to be the user location. Also, the controller 150 outputs the guide message (for example, "Input a signal!") for providing the more precise search.

As described above, the image display device 100 according to an embodiment of the present invention searches for the user using the camera, the microphone, or the external input device. In addition, the controller 150 searches for the user by combining the methods described above referring to FIGS. 11 to 14 in order to improve the precision of the search. In this instance, the search for the user is performed with more precision by weighting the methods.

Figure 15:
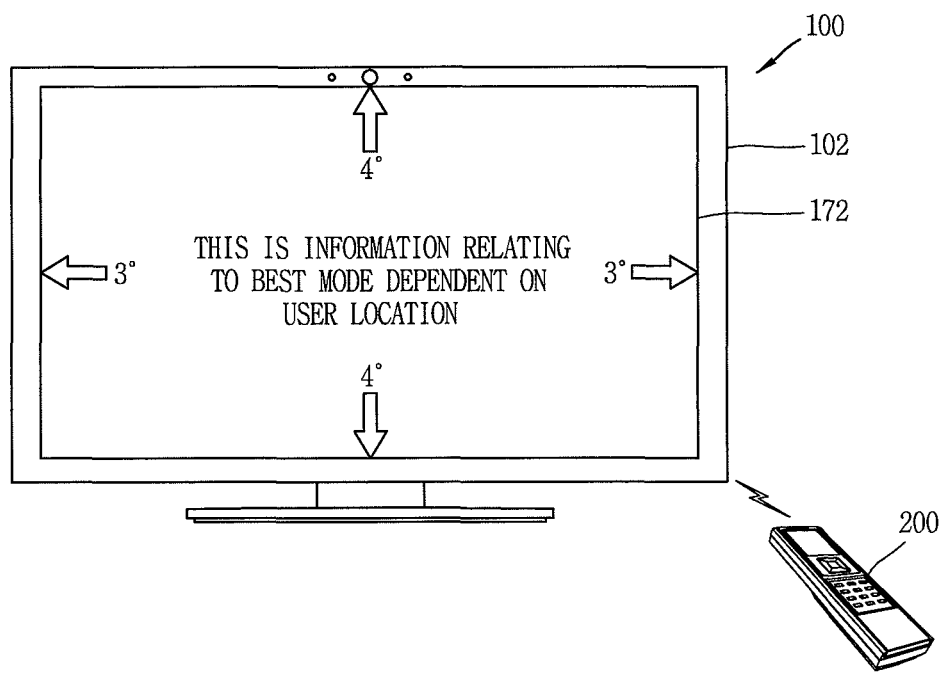
FIG. 15 is a diagram illustrating the image display device that outputs transformation information according to the embodiment of the present invention.

The image display device 100 outputting the transformation information according to the embodiment of the present invention is described below referring to FIG. 15. Referring to FIG. 15, the transformation information relating to the "best mode" that is dependent on the searched-for user location is illustrated on the flexible display unit 172. That is, the controller 150 outputs the transformation information relating to the flexible display unit 172 for providing the sense of suitable immersion at the user location.

According to the transformation information illustrated in FIG. 15, the best mode is such that at the searched-for user location, the left and right edge portions are bent by three degrees compared to an initial state in which the transformation does not occur and the upper and lower edge portions are bent by four degrees compared to the initial state. The user can check the bent portion of the image display device, the bending direction, and the extent of the bending.

On the other hand, the transformation information includes a maximum value information indicating the maximum possible extent of transformation. For example, a maximum value ranging from "−15" to "+15" is output with respect to the left and right edge portions. The plus sign and the minus sign indicate the directions of transformation.

In addition, the user can use the transformation information using the external input device 200. For example, at least one part of the flexible display unit 172 that is intended to be transformed is selected using the directional key provided on the external input device 200 and at least one of the direction in which the selected one part is transformed and the extent (size) to which the elected one part is transformed is changed.

The one part of the flexible display unit 172 that is intended to be transformed is at least one of the upper, lower, left, and right edge portions of the flexible display unit 172, or when the drive units 190 (refer to FIG. 9) are configured in the shape of multiple cells, is at least one of the multiple cells.

Accordingly, the flexible display unit 172 of the image display device 100 can be transformed as the user desires. Furthermore, in addition to the best mode, the image display device 100 according to the embodiment of the present invention provides various transformation modes with respect to the flexible display unit 172.

Figure 16A:
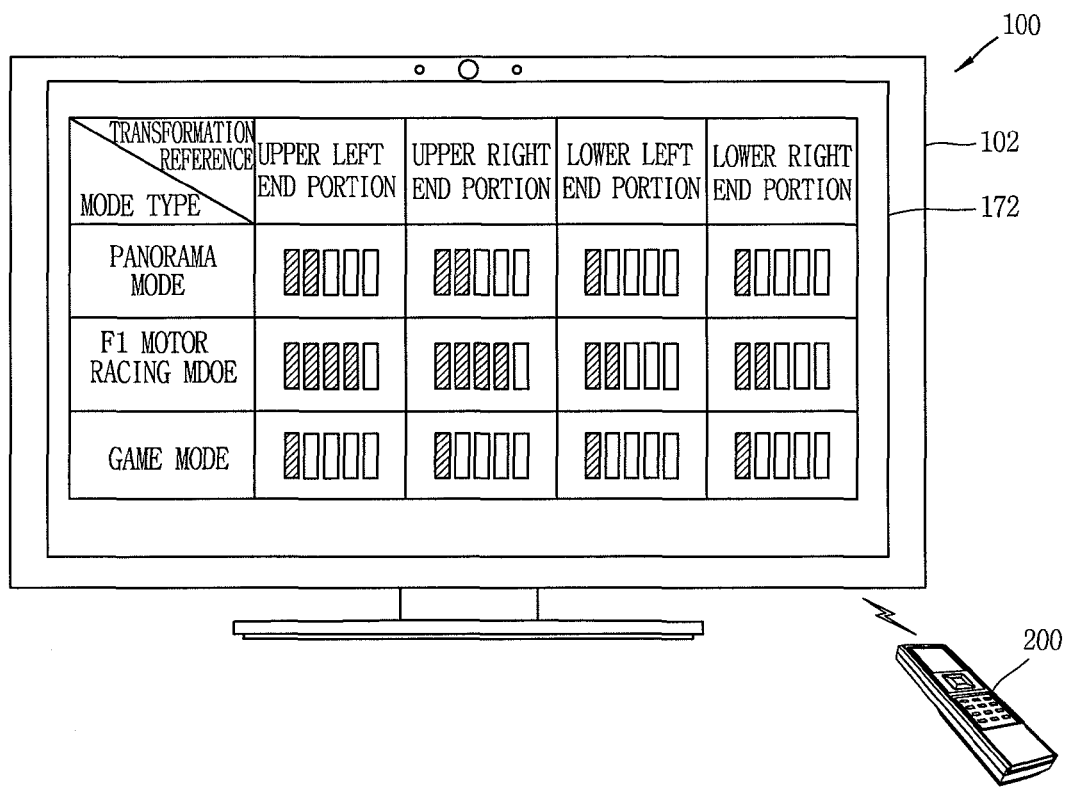
FIGS. 16A and 16B are diagrams illustrating the image display device that provides various transformation modes according to the embodiment of the present invention.
Figure 16B:
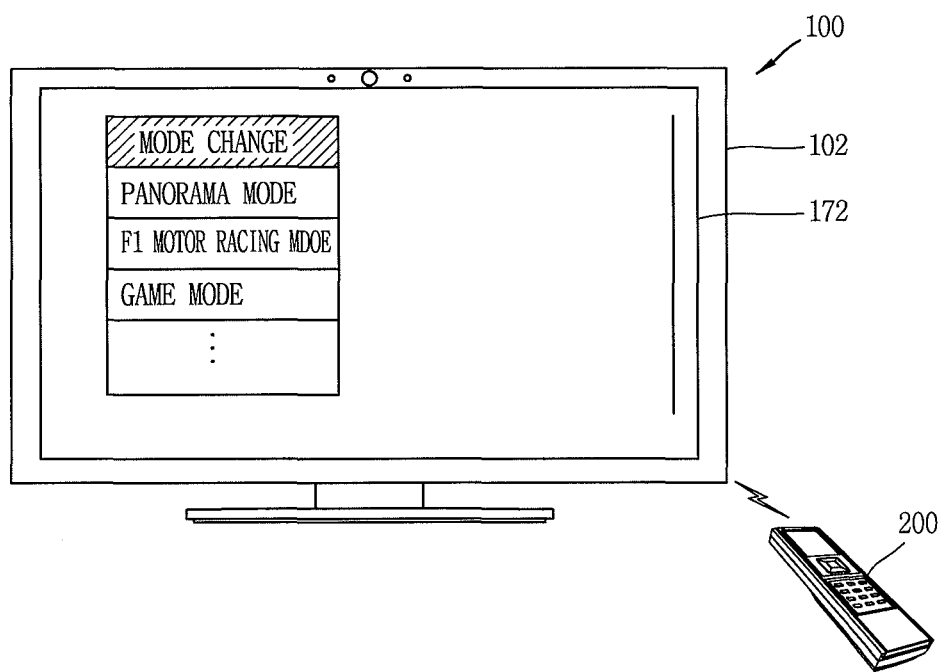

FIGS. 16A and 16B are diagrams illustrating the image display device 100 that provides the various transformation modes according to the embodiment of the present invention. Referring to FIG. 16A, the flexible display unit 172 outputs a predetermined transformation mode. The transformation mode means a state for transforming at least one part of the flexible display unit 172 or a state in which at least one part of the flexible display unit 172 is transformed, according to the content.

For example, a "formula one world championship (F1) motor race mode" means a mode for watching F1 motor racing or a mode for enjoying a F1 car race game and means an optimal state in which the realistic watching of motor racing is possible. The "F1 motor racing mode" is such that in order to produce the optimal state, that is, a state in which the sense of immersion is provided as if by riding a motor car, the upper edge portion of the flexible display unit 172 is bent to a larger extent, and the lower edge portion is bent to a lesser extent. Accordingly, referring to FIG. 16A, there are assumed to be five levels of flexibility with the highest level being a level 5. In the "F1 motor race mode," the upper left and upper right edge portions are bent to a level 4, and the lower left and lower right edge portions are bent to a level 2.

In addition, a "panorama mode" optimized for watching movies, a "game mode" optimized for playing a game, and other modes are set, although not illustrated in the drawings, the various transformation modes for a drama, news, sports, and the like are set.

On the other hand, the transformation mode can be added or deleted, or can be edited by the user. In an example of editing the transformation mode, the user can select a specific transformation mode using the external input device 200 and the like and edit the name of the transformation mode, the portion that is intended for transformation, the extent of transformation and the like.

Then, the user can select the transformation mode that is intended for editing while watching the content. In response to a list outputting command, the controller 15 outputs a list of transformation modes to the flexible display unit 172. For example, the list outputting command is received through the use of a button for outputting the list of transformation modes, which is provided on the external input device 100.

In addition, when one transformation mode is selected from the list that is output, the controller 150 transforms at least one part of the flexible display unit 172, based on the selected transformation mode.

Because the flexible display unit 172 can be transformed in the various methods depending on the content, using a predetermined transformation mode, this improves not only the user convenience, but also the sense of immersion at the time of the watching.

On the other hand, if the user is searched for with the cameras, the multiple users can be searched for. The image display device 100 when the multiple users are searched for is described in detail below referring to FIG. 17.

Referring to FIG. 17, the image display device 100 according to the embodiment of the present invention includes the flexible display unit 172 that outputs the image captured by the camera 181. If the user is searched for, the controller 150 outputs the graphic object on a position of the user that is searched for on the image.

If the multiple users are searched for, the controller 150 outputs the graphic objects with respect to the multiple users. Then, at least one user who serves as a reference in transforming at least one part of the flexible display unit 172 is selected from among the multiple users.

Then, the controller 150 outputs tags, obtained by tagging the multiple users, on the flexible display unit 172 and causes at least one user of the tagged users to be selected using the tag associated with at least one user. At this point, the controller 150 numbers the tags in increasing order of the number.

For example, referring to FIG. 17, the tagging is performed with respect to each of the users in increasing order of the number (1->2->3). At this point, when the tag is selected using the voice recognition and the external input device 200, the user corresponding to the selected tag is selected. That is, a voice "Number two" is recognized, the controller 150 selects the user associated with the tag "two" from among a total of three users. Then, at least one part of the flexible display unit 172 is transformed based on the selected user.

Figure 18A:
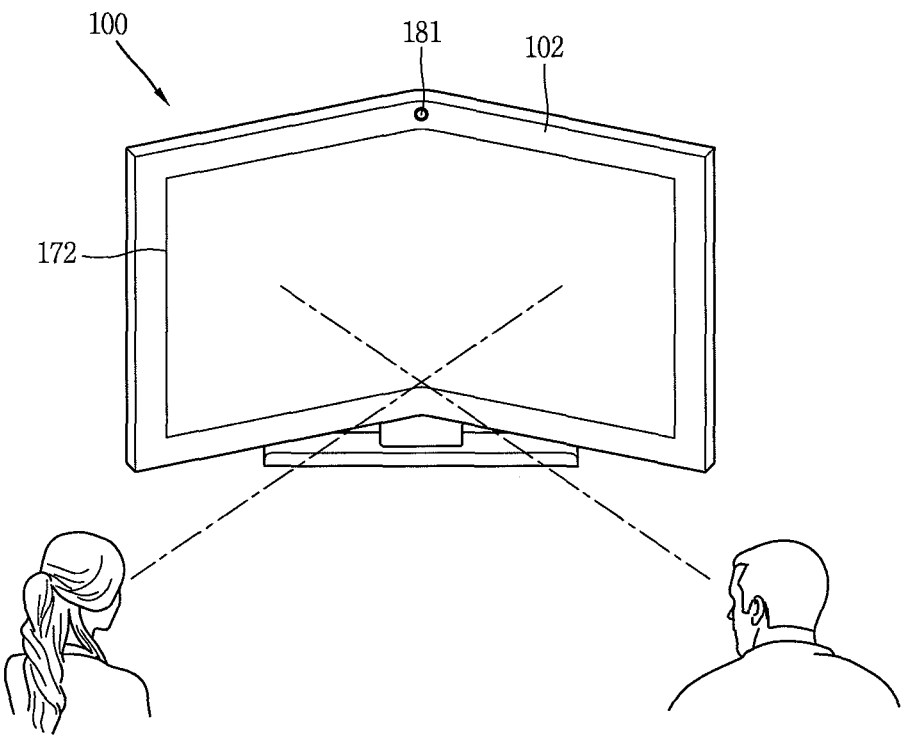
FIGS. 18A and 18B are diagrams illustrating when the multiple users are searched for in the image display device according to one embodiment of the present invention.
Figure 18B:
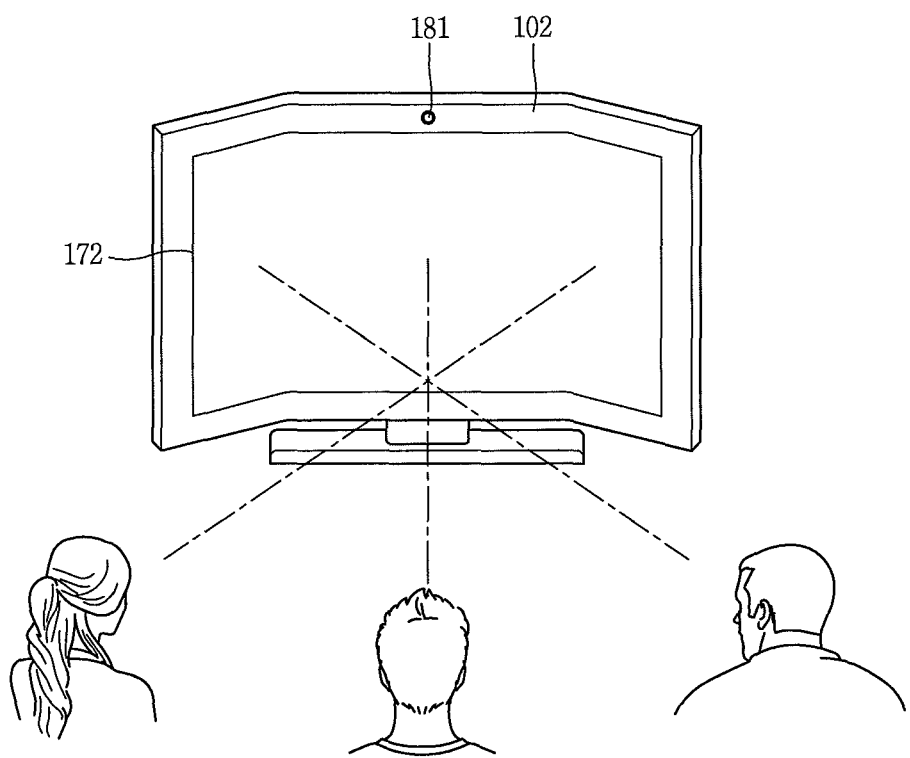

If the multiple users are selected, referring to FIGS. 18A and 18B, the controller 150 bends at least one part of the flexible display unit 172 so that an optimal view is provided depending on each of the searched-for user locations. That is, considering the field of view that is dependent on the searched-for user location, the flexible display unit 172 is transformed so that at least one part of the flexible display unit 172 faces toward the searched-for user.

That is, if the multiple users are searched for, the image display device 100 according to the embodiment of the present invention selects at least one user. Additionally, the image display device 100 divides the flexible display unit 172 into at least two regions so that the optimal view is provided with respect to each of the multiple users and transforms the regions that results from the division at different angles in different directions so that the regions that result from the division face toward the users, respectively.

Figure 19A:
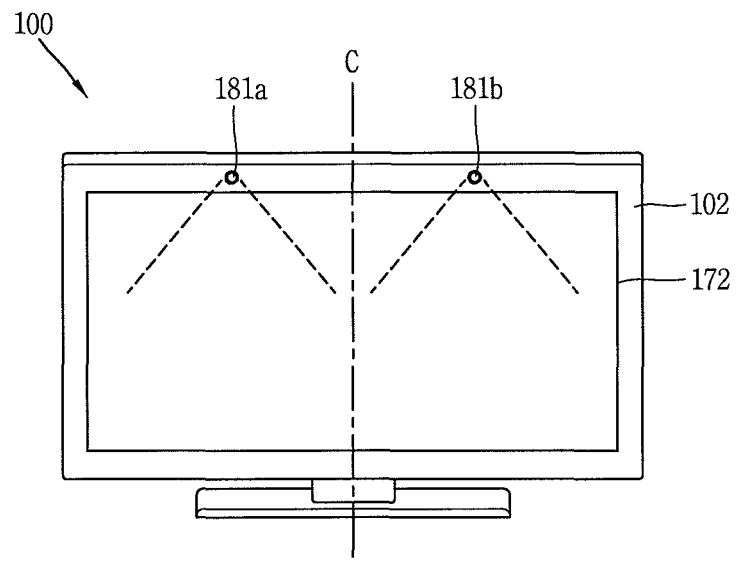
FIGS. 19A and 19B are diagrams illustrating when the camera is included in one end portion of the bent main body.
Figure 19B:
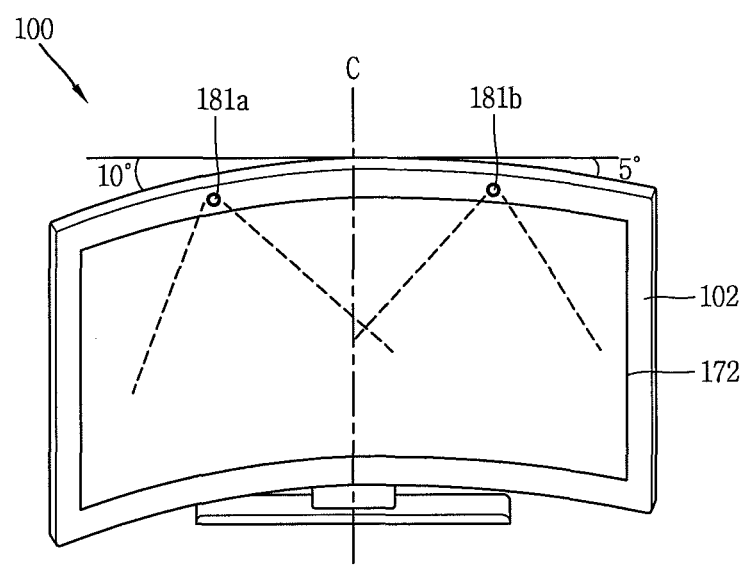

FIGS. 19A and 19B are diagrams illustrating when the camera is included in one end portion of the bent main body 102. In FIG. 19A, two cameras 181a and 181b are illustrated as being mounted on the main body 102, but in the image display device 100 according to the embodiment of the present invention, at least one camera is mounted on the main body 102. Then, a portion on which the camera is mounted transformed depending on the user location.

Further, the transformation of at least one part of the flexible display unit 172 is completed, the controller 150 causes the camera to capture the image again when the transformation is completed and re-searches for the user location using the image that is again captured. This is because when the portion including the camera is transformed, the image captured by the camera is also changed. Therefore, the controller 150 performs re-search to improve the precision of the search for the user.

Furthermore, the image display device 100 according to the embodiment of the present invention divides the main body 102 into the first and second regions and includes the first and second cameras corresponding to the first and second regions, respectively. For example, referring to FIGS. 19A and 19B, the left region and the right region are distinguished from each other with a dashed line c in between, and the first and second cameras 181a and 181b are mounted on the left and right regions, respectively.

In addition, the controller 150 transforms the first and second regions differently depending on the searched-for user location. The directions in which the first and second cameras 181a and 181b capture images vary depending on the transformation, and the controller 150 re-searches for the user from a transformation location. More cameras can be provided if needed, and accordingly the image display device 100 according to the embodiment of the present invention can search for the user in a broader range.

Moreover, the image display device 100 according to the embodiment of the present invention further includes first and second audio output units. When at least one part of the flexible display unit 172 is transformed, the controller 150 controls the first and second audio output units so that amounts of sound that are output from the first and second audio output units are different from each other.

When the user location is not in a straight line with the center "c" of the image display device 100, the first and second regions are transformed differently. For example, the user is positioned to the left with respect to the center "c", the transformation is made so that the right region of the flexible display unit 172 with respect to the center "c" gets closer to the user (refer to FIG. 12C).

Generally, the first and second audio output units are arranged to the left and to the right with respect to the center of the image display device 100, respectively. If the user is not positioned in a center line, the amount of sound that are output from the first and second audio output units need to be adjusted by an amount of transformation of at least one part of the flexible display unit 172. This is done to maintain a balance in sound between the left and right regions and thus improve the sense of immersion.

Accordingly, the controller 150 controls the first and second audio output units so that of the first and second audio output units, one that is positioned closer to the searched-for user outputs a greater amount of sound than the other.

On the other hand, the image display device 100 according to the embodiment of the present invention transforms at least one part of the flexible display unit 172, considering not only the user location but also the type of content. The image display device 100 that transforms at least one part of the flexible display unit 172 depending on a type of content is described below referring to FIGS. 20 and 21.

Figure 20:
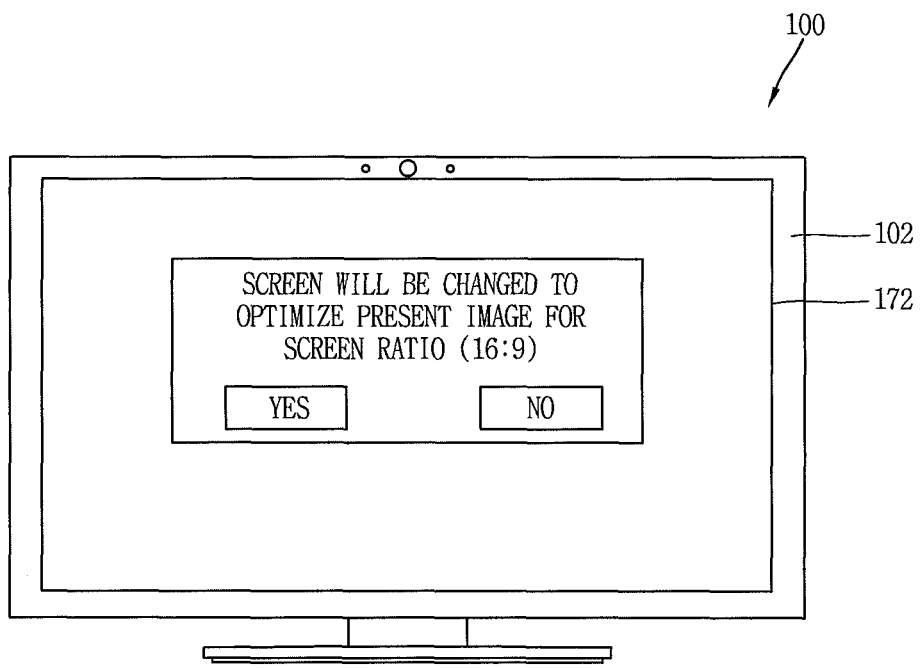
FIG. 20 is a diagram illustrating the image display device in which a screen ratio of content that is output is considered according to one embodiment of the present invention.

FIG. 20 is a diagram illustrating the image display device 100 in which a screen ratio of the content that is output is considered according to one embodiment of the present invention.

The image display device 100 according to an embodiment of the present invention stores the transformation mode that is dependent on the screen ratio in the storage unit 160, and the controller 150 transforms at least one part of the flexible display unit 172 using the information stored in the storage unit 160.

Referring to FIG. 16A, as described above, the controller 150 outputs the transformation mode that is dependent on the screen ratio on the flexible display unit 172. Then, the user can change the transformation mode using the external input device 200 and the like.

Figure 21:
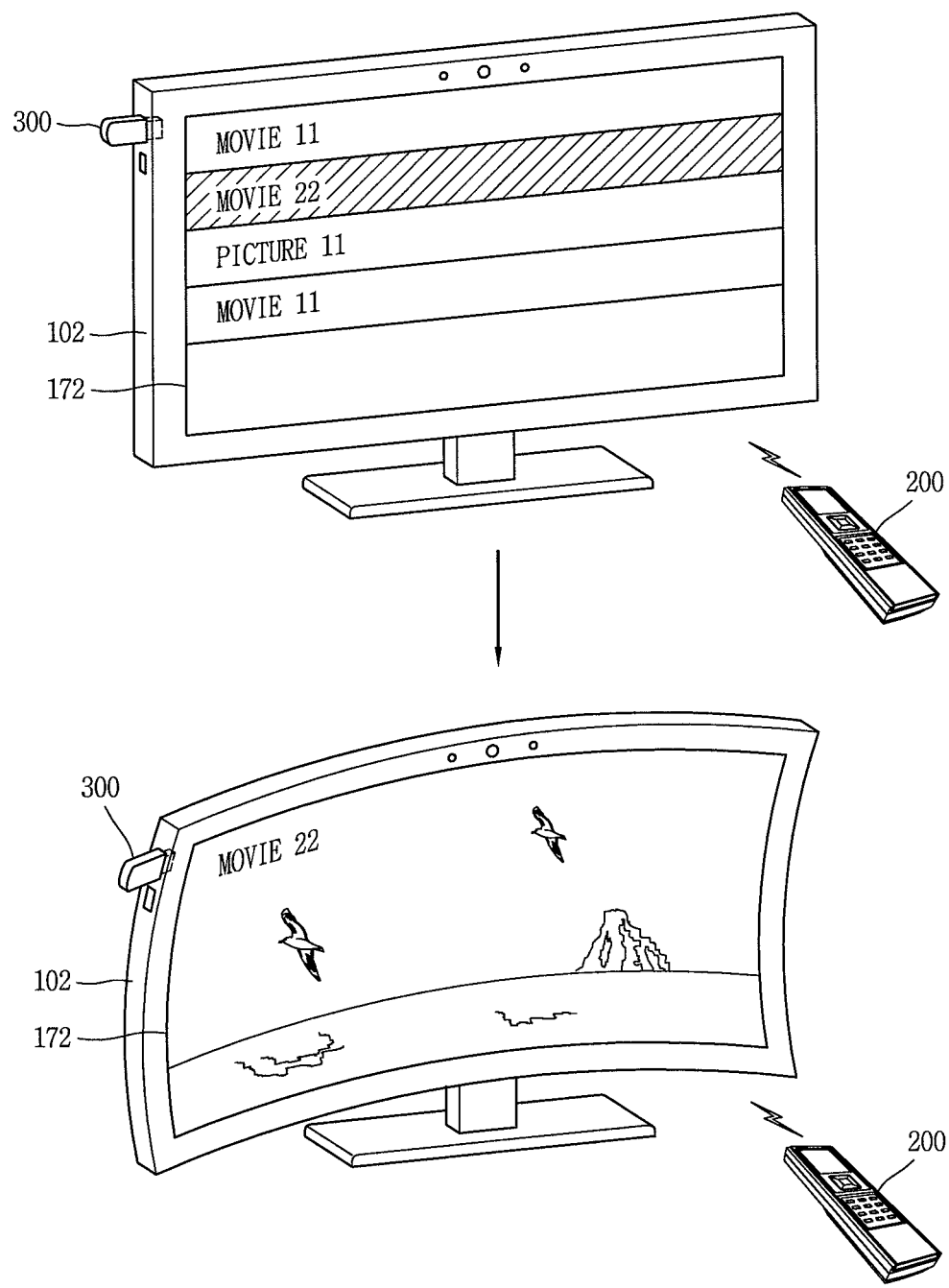
FIG. 21 is a diagram illustrating the image display device in which the content is considered according to one embodiment of the present invention.

FIG. 21 is a diagram illustrating the image display device 100 in which the content is considered according to one embodiment of the present invention.

The content means letters, symbols, voice, sound, an image, a picture, or the like that can be output on the flexible display unit 172. At this point, the content is stored in the storage unit 150 of the image display device 100, is stored in a server that can be accessed through the user of wireless communication, or is stored in a separate storage unit 300 that is connected over the air or by cable. The image display device 100 according to one embodiment of the present invention in when the content is stored in the separate storage unit 300 is described below.

At this point, the controller 150 outputs a list of content on the flexible display unit 172. For example, when the storage unit 300 is connected to the image display device 100, the controller 150 searches the storage unit 300 for the stored content and outputs the list of content.

Then, the user can select one item of content "MOVIE 22" that he or she desires to watch, from the list of content that is output. For example, the user can select one item of content from the multiple items of content that are output on the flexible display unit 172, by applying the touch input. As another example, the user can select one item of content using any one of the external input device 200 and the voice recognition.

When any one item of content is selected, the controller 150 can grasp a type of content using a filename extension of the selected item of content, metadata or a filename included in the content, or the like.

At this point, the controller 150 plays back the selected item of content and at the same time, transforms at least one part of the flexible display unit 172, based on the type of the selected item of content. That is, the flexible display unit 172 is transformed differently depending on which content is selected. For example, when the "MOVIE 22" corresponding to a movie is selected, the controller 180 transforms the flexible display unit 172 to a curvature that is set corresponding to the movie.

The types of content and the transformation state of the flexible display unit 172 that is dependent on each type of content are stored in the storage unit 160 and are edited by the user.

On the other hand, when the outputting of the content is terminated (for example, 1. when receiving a power-off command, 2. when completing the playing-back of the content, 3. when receiving a channel switching command, and so forth), the controller 150 restores the flexible display unit 172 to its original state. In addition, when receiving a command for outputting a different item of content, the controller 150 transforms at least one part of the flexible display unit 172, based on a type of different content.

The image display device according to one embodiment of the present invention and a method of controlling the image display device transforms at least one part of the flexible display unit, depending on the searched-for user location, using the flexibility characteristics of the flexible display unit.

Since the flexible display unit is transformed so that the flexible display unit is bent differently depending on the user location, a stereoscopic screen is provided, and thus the sense of immersion can be maximized. That is, since the display unit get bent in the shape of a curved surface similar to that of a human eye depending on the user location, an area of a screen that is recognized by the human eye increases and a distance from the human eye to the center of the screen becomes the same as a distance from the human eye to the lateral side. As a result, a phenomenon in which recognizability of the edge portion is decreased is reduced. Accordingly, an environment can be provided in which the sense of immersion and the comfortableness are provided while watching the display unit.

The user can be provided not only with an optimal display view at his/her current location without having to change the location of the mobile, but also with the environment in which in which the sense of immersion and the comfortableness are provided depending on the type of content while watching the display unit.

On the other hand, according to one embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet).

The foregoing embodiments and advantages are merely and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An image display device comprising:
   a main body;
   at least one camera arranged on a front side of the main body;
   a flexible display unit arranged on the front side of the main body;
   a drive unit arranged on a rear side of the flexible display unit and configured to bend at least one part of the flexible display unit; and
   a controller configured to search for a user location using an image captured by the at least one camera and control the drive unit to transform the at least one part of the flexible display unit based on the searched user location,
   wherein the controller is further configured to:
   display the image on the flexible display unit;
   display a graphic object on a position of a user corresponding to the searched user location;
   change at least one of a position and a size of the graphic object using a signal received from an external input device; and
   transform the at least one part of the flexible display unit, based on at least the changed at least one of the position and size of the graphic object.

2. The image display unit of claim 1, wherein if multiple users are included in the image, the controller is further configured to select at least one user as a reference when transforming the at least one part of the flexible display unit.

3. The image display device of claim 2, wherein the controller is further configured to display tags to the multiple users on the flexible display unit, and select the at least one user as the reference based on a selected tag.

4. The image display device of claim 3, wherein the controller is further configured to number the tags in an increasing order.

5. The image display device of claim 1, wherein when the controller completes the transformation of the at least one part of the flexible display unit, the controller is further configured to control the camera to capture another image, and research for the user location using the another image.

6. The image display device of claim 1, further comprising:
   at least first and second microphones,
   wherein the controller is further configured to search for the user location using a difference in time between sound signals from the first and second microphones.

7. The image display device of claim 1, wherein the controller is further configured to search for the user location using the signal received from the external input device.

8. The image display device of claim 1, wherein the controller is further configured to display transformation information relating to the flexible display unit on the flexible display unit.

9. The image display device of claim 8, wherein the controller is further configured to change the transformation information using information received from the external input device and transform the at least one part of the flexible display unit based on the changed transformation information.

10. The image display unit of claim 1, further comprising:
    at least first and second audio output units,
    wherein as the at least one part of the flexible display unit is transformed, the controller is further configured to control an amount of sound output from the first and second audio output units to be different from each other.

11. The image display device of claim 10, wherein the controller is further configured to control one of the first and second audio output units that is positioned closer to the searched user location to output a greater amount of sound than the other of the first and second audio output units.

12. The image display device of claim 1, wherein the controller is further configured to display information relating to the searched user location on the flexible display unit.

13. The image display device of claim 1, wherein the closer the searched user location is to a center of the flexible display unit, the greater a curvature of the at least one part of the flexible display unit is transformed.

14. The image display device of claim 1, wherein the controller is further configured to transform the at least one part of the flexible display unit by bending the at least one part of the flexible display unit to be closer to the searched user location.

15. The image display device of claim 1, wherein the controller is further configured to transform the at least one part of the flexible display unit so that a constant distance is maintained between an entire region of the flexible display unit and the searched user location.

16. The image display device of claim 1, wherein the controller is further configured to restore the at least one part of the flexible display unit to its original state based on receiving a power-off command.

* * * * *